(12) United States Patent
Ogino et al.

(10) Patent No.: US 6,441,859 B2
(45) Date of Patent: Aug. 27, 2002

(54) IMAGE SIGNAL TRANSMITTING METHOD, SUPERIMPOSED SIGNAL EXTRACTING METHOD, IMAGE SIGNAL OUTPUT APPARATUS, IMAGE SIGNAL RECEIVING APPARATUS AND IMAGE SIGNAL RECORDING MEDIUM

(75) Inventors: Akira Ogino, Chiba; Nozomu Ikeda, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/871,879

(22) Filed: Jun. 4, 2001

Related U.S. Application Data

(62) Division of application No. 09/003,816, filed on Jan. 7, 1998, now Pat. No. 6,271,887.

(30) Foreign Application Priority Data

| Jan. 20, 1997 | (JP) | ............................................... 9-008079 |
| Jan. 20, 1997 | (JP) | ............................................... 9-008080 |
| Jan. 20, 1997 | (JP) | ............................................... 9-008081 |

(51) Int. Cl.$^7$ ............................................... H04N 7/08
(52) U.S. Cl. .......................................... 348/473; 386/94
(58) Field of Search ................................ 348/473, 469; 375/240.01, 240.26; 386/94; 380/201–204

(56) References Cited

U.S. PATENT DOCUMENTS

| 5,809,139 A | * | 9/1998 | Girod ............................. 380/5 |
| 6,005,643 A | * | 12/1999 | Murimoto et al. ........... 348/845 |

* cited by examiner

*Primary Examiner*—Victor R. Kostak
(74) *Attorney, Agent, or Firm*—Jay H. Maioli

(57) ABSTRACT

A method and apparatus for superimposing additional information, such as duplication control information, on an image signal made up of first pictures encoded without using a predictive encoding and second picture encoded using a motion compensating prediction. Codes are generated with a timing based on an appearance of the first picture and then the additional information is superimposed on the image signal using the generated codes. The additional information already superimposed on such an image signal can be extracted in a similar fashion by generating codes based on the appearance of the first picture.

8 Claims, 17 Drawing Sheets

DUPLICATION PREVENTING CONTROL SIGNAL
SPECTRUM BEFORE SPECTRUM SPREAD

DUPLICATION PREVENTING CONTROL SIGNAL
SPECTRUM AFTER SPECTRUM SPREAD

SPECTRUM OF INFORMATION SIGNAL SUPERIMPOSING
THE SS DUPLICATION PREVENTING CONTROL SIGNAL

SIGNAL SPECTRUM AFTER INVERSE SPREAD OF
SPECTRUM IN THE RECORDING APPARATUS SIDE

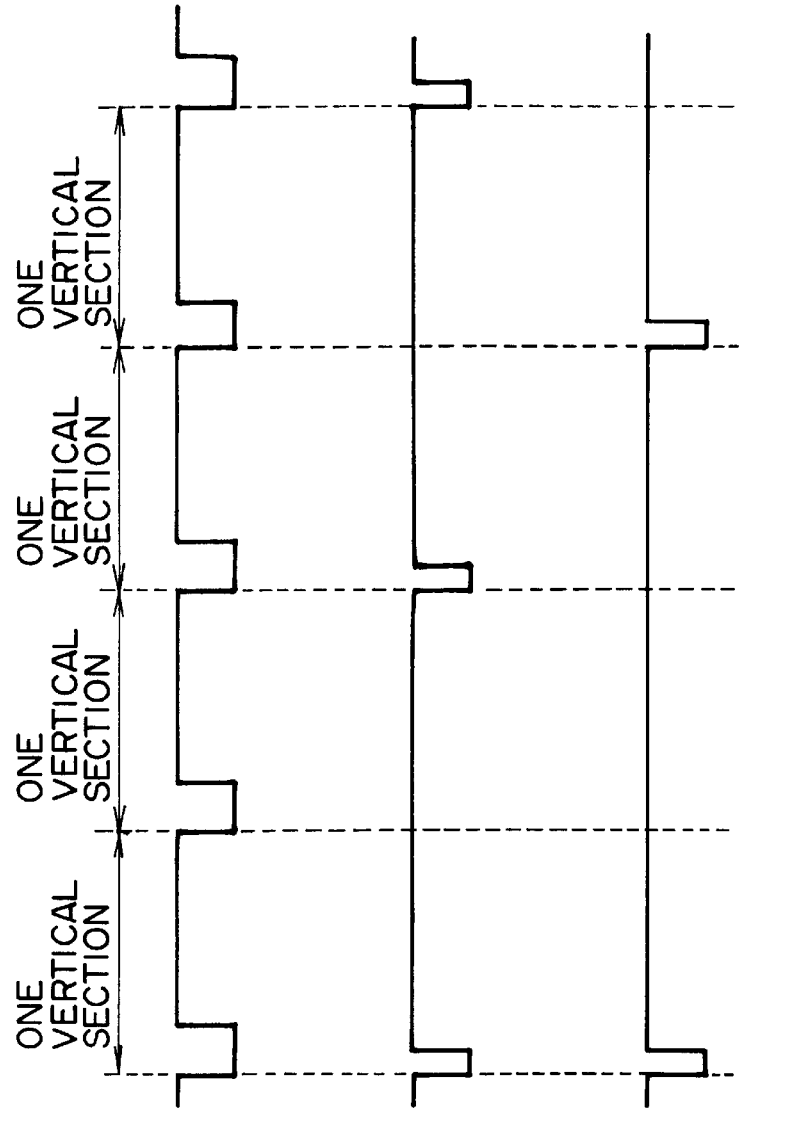

IMAGE SIGNAL TRANSMITTING METHOD, SUPERIMPOSED SIGNAL EXTRACTING METHOD, IMAGE SIGNAL OUTPUT APPARATUS, IMAGE SIGNAL RECEIVING APPARATUS AND IMAGE SIGNAL RECORDING MEDIUM

This application is a division of Ser. No. 09/003,816, filed Jan. 7, 1998 now U.S. Pat. No. 6,271,887.

BACKGROUND OF THE INVENTION

1. Field of the Invention

The present invention relates to a method and an apparatus for enabling duplication preventing control depending on an extracted additional information which may be done by outputting an image signal superimposing an additional information and then receiving such image signal to extract the superimposed additional information and also relates to an image signal recording medium, for example, in such a case that an image signal recorded in a recording medium is reproduced, it is then transmitted together with a duplication preventing signal and the transmitted image signal is received to limit or inhibit recording thereof to the other recording medium.

2. Description of the Related Art

A VTR (Video Tape Recorder) is widely used and many software applications which may be reproduced by the VTR are now available. Particularly, a regenerating apparatus such as a digital VTR and DVD (Digital Video Disk) is appearing as novel apparatus in these days. Therefore it is now possible to enjoy the image and sound of high quality and high fidelity by easily regenerating the recorded image and sound.

However, in one hand, such excellent apparatus has brought about a new problem that abundant software applications which are available in the market are probably be copied without limitation and various kinds of duplication preventing measures have been considered.

For example, although it is not a method to prevent in direct the duplication of analog image signal, a method for substantially preventing the duplication has been proposed. In this method, difference in the AGC (Auto Gain Control) systems between the VTR as the recording apparatus and a monitor receiver for providing images is used or difference in the APC (Auto Phase Control) thereof is used for the purpose of preventing duplication of software applications.

Namely, the former method utilizes difference of the AGC system in which VTR, for example, performs AGC using a pseudo synchronous signal inserted in the image signal, while the monitor receiver employs the AGC system not depending on such pseudo synchronous signal. In this case, at the time of recording an analog image signal into an original recording medium, a pseudo synchronous signal of extremely higher level is superimposed as the synchronous signal for AGC to such analog signal and thereby the pseudo synchronous signal of extremely higher level is inserted to the synchronous signal for AGC into the image signal to be supplied to the recording VTR from the regenerating VTR.

Moreover, in the latter method, difference of such APC characteristic that APC follows a color burst signal with a short time constant in the VTR but it follows with a comparatively longer time constant in the monitor receiver. Namely, at the time of recording an analog image signal into an original recording medium, phase of a color burst signal of the image signal is partially inverted and thereby the signal in which the phase of the color burst signal is partially inverted is output as the image signal supplied to the recording VTR from the regenerating VTR.

In the case explained above, in the monitor receiver which receives supply of an analog image signal from the regenerating VTR, image signal is normally reproduced without receiving any influence of the pseudo synchronous signal and partial phase inversion of the color burst signal used for APC.

However, in the VTR which records the signal to a recording medium by receiving the analog image signal which has superimposed the pseudo synchronous signal as explained from the regenerating VTR or is subjected to the phase inversion control of the color burst signal, it is impossible to normally realize the gain control or phase control depending on the input signal and thereby the image signal cannot be recorded normally. Accordingly, if the recorded image signal is reproduced, the normal image to enjoy excellent image and sound can no longer be reproduced.

In the case of processing the analog image signal, duplication is not inhibited but it is made impossible to obtain the reproduced signal which cannot used for watching and hearing and this method is rather concluded as the so-called negative duplication preventing control.

On the other hand, in the case of the processing the digital information, for example, the digital image signal, a direct duplication preventing control is executed to inhibit the duplication by adding a duplication preventing control signal consisting of a duplication preventing code or a duplication generation limiting code to-the image signal as a digital data and thereby recording such code and image signal to a recording medium.

FIG. 1 shows a basic structure of a duplication apparatus for processing a digital information. In this structure, a digital information reproduced by a digital regenerating apparatus 110 is sent to a digital recording apparatus 120 via a digital transmission line 101 and thereby such digital information which is allowed to be duplicated is duplicated but the information which is not allowed inhibited for duplication.

In a recording medium 111 loaded in the digital regenerating apparatus 110, a duplication preventing control information as an additional information is recorded in addition to a digital main information. This duplication preventing control information instructs duplication inhibit, duplication acknowledgment, limitation of duplication generation as the details of control. A digital regenerating means 112 reads information from the recording medium 111 to obtain the duplication preventing control information with the digital main information and then sends such pieces of information to a digital recording apparatus 120 via a digital transmission line 101.

A duplication preventing control signal detecting means 122 of the digital recording apparatus 120 detects the duplication preventing control signal from the information received via the digital transmission line 101 to discriminate details of control and then transfers this discrimination result to the digital recording means 121.

The digital recording apparatus 121 converts, when discrimination result of the duplication preventing control signal from a duplication preventing control signal detecting means 122 allows recording of the digital information input from the digital transmission line 101, the input digital signal into the digital information suitable for recording and executes the recording by writing such digital information into the recording medium 123. On the other hand, when the discrimination result of the duplication preventing control signal from the duplication preventing control signal detecting means 122 does not allow duplication, the digital recording means 121 does not execute the recording of the input digital information.

Moreover, when the discrimination result of the duplication preventing control signal from the duplication preventing control signal detecting means 122 allows only first duplication generation, the digital recording means 121 converts the input digital to the digital information suitable for recording and executes the recording by writing such digital information to the recording medium 123 and also changes the duplication preventing control signal as the additional information into the signal to instruct inhibit of duplication (inhibit of duplication of the next generation) and also records such inhibit signal to the recording medium 123. Therefore, it is impossible to duplicate the image signal using the duplicated recording medium 123.

As explained above, in the case of the so-called digital connection in which the main information signal and the duplication preventing control signal as an additional information are supplied to the recording apparatus as the digital signals, a duplication preventing control signal is included in the digital data to be transmitted. Therefore, the recording apparatus surely can execute the duplication preventing control such as inhibit of duplication by utilizing such duplication preventing control signal.

Meanwhile, when the digital VTR of FIG. 1 is for example a digital VTR, in view of monitoring the reproduced image signal and voice signal, only the image signal as the main information signal and the voice signal are converted to analog signals via a D/A converting circuit 113 and these analog signals are usually led to an analog output terminal 114 to which a monitor receiver is connected.

As explained, even in the case of the digital information regenerating apparatus, the duplication preventing control signal is not included in the analog signal connected to the analog output terminal 114. Therefore, the analog connection for connecting an analog VTR to the analog output terminal 114, duplication of information signal is possible.

Therefore, it is considered to add, by superimposition, the duplication preventing control signal to the D/A converted image signal and voice signal, but it is difficult to add the duplication preventing control signal and then extract it in the recording apparatus to use for duplication preventing control without any deterioration of the D/A converted image signal and voice signal.

Therefore, for the analog connection, it has been only way, as the negative duplication preventing method, to introduce the duplication preventing method utilizing difference of AGC systems between the VTR and monitor receiver or difference of APC systems thereof.

However, in the case of the duplication preventing control method utilizing difference of AGC systems or APC systems between the VTR and monitor receiver as explained above, the image signal can be recorded normally depending on the AGC system or APC system in the recording apparatus side, yet disabling the negative duplication preventing method. Moreover, it has also been liable that reproduced image on the monitor receiver is disturbed.

As a duplication preventing control system which has solved the problems explained above and is effective for any of the analog connection and digital connection without deterioration of image and voice to be reproduced, the applicant of the present invention has proposed a system in which the image signal is recorded in digital or analog by spreading the spectrum of the duplication preventing control signal and then superimposing the spread spectrum duplication preventing control signal to the image signal of the analog signal condition (Japanese Patent Application No. HEI 7-339959).

In this system, the pseudo random noise code (hereinafter referred to as the PN code) used as the spreading code is generated at a sufficiently higher velocity and this code is then multiplied to the duplication preventing control signal for the purpose of spectrum spreading and thereby to convert the narrow band and high level duplication preventing control signal into the broad band and low level signal which does not give any effect on the image signal and voice signal. This spread spectrum duplication preventing control signal is superimposed on the analog image signal and then is recorded on a recording medium. In this case, the image signal recorded on the recording medium may be analog signal or digital signal.

In this system, since the duplication preventing control signal subjected to spectrum spread and is then superimposed on the image signal as the broad band and low level signal, it is difficult for a person who is trying to make illegal duplication to extract the superimposed duplication preventing control signal from the image signal.

But, it is possible to detect the duplication preventing control signal superimposed by executing inverse spectrum spread and use it for a certain purpose. Therefore, the duplication preventing control signal can surely be provided in combination with the image signal to the recording apparatus side and the duplication preventing control signal can also surely be detected in the recording apparatus side to reliably execute the duplication control depending on the duplication preventing control signal.

But, as explained above, in the case of the system where the spread spectrum duplication preventing control signal is superimposed to the image signal, the spread spectrum duplication preventing control signal is sometimes eliminated, deteriorated or changed.

For example, a noise reduction system for reducing noise of the image signal by utilizing the correlation between pixels in the horizontal direction of the image signal (hereinafter referred to as correlation in the horizontal direction), correlation between horizontal scanning lines (hereinafter referred to as correlation in the vertical direction), correlation between fields or correlation between frames takes a difference of image signals between the pixels in the adjacent horizontal direction or between the horizontal scanning lines and eliminates the difference obtained as the noise.

When such noise reduction system is used, the spread spectrum duplication preventing control signal superimposed to the image signal is detected as a difference and it is probably, eliminated as explained above Moreover, when such duplication preventing control signal is eliminated, it is also probable that the other spread spectrum duplication preventing control signal is newly added.

In addition, when the noise reduction system utilizing the correlation of the horizontal direction or correlation in the vertical direction of the image signal is used, the duplication preventing control signal may sometimes be deteriorated, for example, the duplication preventing control signal superimposed on the image signal is partly eliminated, although not all of the spread spectrum duplication preventing control signal superimposed on the image signal. In such a case, the accurate duplication preventing control signal superimposed to the image signal cannot be extracted, disabling duplication preventing control depending on the duplication preventing control signal.

Furthermore, in the case of enlarging or compressing an image reproduced by the image signal to which the spread spectrum duplication preventing control signal is superimposed by utilizing a so-called zoom mode, the image signal is interpolated by the other adjacent image signal or the image signal is curtailed. In this case, since the spread spectrum duplication preventing control signal superimposed to the image signal changes, if the inverse spread spectrum is performed, the original duplication preventing control signal before the spread spectrum cannot be extracted normally in some cases.

Moreover, when the so-called wide mode in which the image of vertical and horizontal ratio of 9:16 is formed using the image signal to form an image in the vertical and horizontal ratio of 3:4 or the so-called cinema mode in which the vertical direction of image is compressed to form an image in the same vertical and horizontal ratio as the movie screen are used, since the interpolation and curtailment are performed for the image signal, the original spread spectrum duplication preventing control signal superimposed to the image signal may be deteriorated. Even when the image display size conversion is performed as explained above, it is impossible in some cases that the spread spectrum duplication preventing control signal superimposed to the image signal cannot be extracted as the original normal duplication preventing control signal.

In addition, even when only the necessary part of the image of one image frame formed by the image signal is used or the unnecessary image part, on the contrary, is deleted, the spread spectrum duplication preventing control signal superimposed to the image signal may be changed. As explained above, even when a part of the image formed by the image signal is used or deleted, the original duplication preventing control signal cannot be extracted.

Moreover, when reproduction is performed in various speeds in the VTR like the specified lower speed reproduction or higher speed reproduction, the image signal of one field may be missed or doubled. Therefore, in the recombined image signal, the spread spectrum duplication preventing control signal is no longer continuous and thereby the inverse spread spectrum will probably disable the recovery of the duplication preventing control signal.

Moreover, when the cutting edition is performed to curtail the image signal in unit of the field, the spread spectrum duplication preventing control signal is no longer continuous in the image signal after the cutting edition and inverse spread spectrum will also probably disable the recovery of the duplication preventing control signal.

Moreover, when the image signal of NTSC system is converted to the PAL system image signal and the image signal of the PAL system is converted, on the contrary, to the NTSC image signal as the image signal conversion, since the number of the horizontal scanning lines forming a frame is different depending on each system, the interpolation is performed by the image signal of the adjacent horizontal scanning line or the horizontal scanning lines are curtailed and thereby the accurate duplication preventing control signal superimposed to the image signal cannot be extracted, disabling the duplication preventing control depending on the duplication preventing control signal.

For example, the image signal of the NTSC system forms an image of one frame with 525 horizontal scanning lines, while the image signal of the PAL system forms an image of one frame with 625 horizontal scanning lines. In the case of converting the image signal of NTSC system into the image signal of PAL system, the interpolation of horizontal scanning line is performed and in the case of converting the image signal of PAL system into the image signal of NTSC system, the horizontal scanning lines are curtailed.

As explained, when the spread spectrum duplication preventing control signal is deteriorated because the image formed by the image signal to which the spread spectrum duplication preventing control signal is superimposed is enlarged or compressed, or system conversion of the image signal is performed or reproduction is executed in the various speeds or cutting edition is performed, since the original duplication preventing control signal cannot be extracted, the duplication preventing control depending on the duplication preventing control signal cannot be executed.

SUMMARY OF THE INVENTION

Considering the problems explained above, it is therefore an object of the present invention to provide a method and an apparatus and an image signal recording medium which eliminate the problems explained above, surely provide an additional information, which is spread spectrum and superimposed to the image signal, to the receiving side and can extract the perfect additional information.

In order to solve the problems explained above, an image signal transmitting method of the present invention is a transmitting method for transmitting a spread spectrum additional information by superimposing to an image signal, characterized in that:

a dispersion code forming one chip with N (N: an integer 1 or larger) fields is generated synchronously with a vertical synchronous signal; and the additional information spread spectrum using the dispersion code is transmitted after it is superimposed to the image signal in the time axis direction in unit of frame.

Moreover, a superimposed information extracting method of the present invention is a method for extracting the additional information from the image signal to which the additional information spread spectrum by the spread code forming one chip with N fields is superimposed in the time axis direction in unit of frame, characterized in that the spread code forming one chip with N fields is produced synchronously with the vertical synchronous signal corresponding to the section where the spread spectrum additional information is superimposed; and the additional information superimposed to the image signal is extracted by inverse spread spectrum using the dispersion code.

According to the image signal transmitting method of the present invention, the additional information is spectrum spread using, for example, the spread code forming one chip with one field (one vertical section) and this spread spectrum additional information is superimposed in every field to transmit the spread spectrum additional information superimposed in the time axis direction of the image signal in unit of frame.

Thereby, the same spread spectrum additional information is superimposed in each field and when the noise reduction system utilizing the correlation in the horizontal direction of the image signal or correlation in the vertical direction, even if a difference between adjacent pixels in the horizontal direction or between the horizontal scanning lines is obtained, the spread spectrum signal superimposed to the image signal is not detected as the difference, this spread spectrum signal is not deleted and deteriorated.

In addition, when the image formed by the image signal is enlarged or compressed, image display size is converted, or the image is partially used or deleted to interpolate or curtail the image signal in unit of pixel or horizontal scanning line (horizontal line), contents of the spread spectrum additional information superimposed into one field of the image signal actually forming an image will never be changed. Accordingly, the spread spectrum additional information superimposed to the image signal is transmitted reliably.

Moreover, according to the superimposed information extracting method of the present invention, for example, the dispersion code for inverse dispersion which forms one chip with one field is generated corresponding to the section where the additional information (spread spectrum signal) synchronized to the vertical synchronous signal is superimposed. Since the inverse spread spectrum is performed using the spread signal for inverse dispersion, the spread spectrum additional information superimposed to the image signal can be extracted.

Accordingly, since it has been eliminated that the spread spectrum additional Information superimposed to the image signal is rejected or deteriorated because the noise reduction system utilizing the correlation in the horizontal direction or correlation in the vertical direction of the image signal is used as explained above and the additional information superimposed to the image signal can surely be extracted even when the image formed by the image signal is enlarged or compressed, image display size is converted and image is partially used or deleted to interpolate or curtail the image signal in unit of pixel or horizontal scanning line (horizontal line).

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 16 is a diagram for explaining the other example of the PN code generation clock signal.

DESCRIPTION OF THE PREFERRED EMBODIMENTS

Embodiments of the image signal transmitting method, superimposed information extracting method, image signal output apparatus, image signal receiving apparatus and image signal recording medium will be explained with reference to the accompanying drawings.

In the following explanation, it is assumed that the image signal output apparatus and image signal recording apparatus are applied to a DVD (digital video disk) recording and regenerating apparatus (herein after referred to as DVD apparatus). Moreover, explanation about the voice signal system will be omitted.

Figure 1:
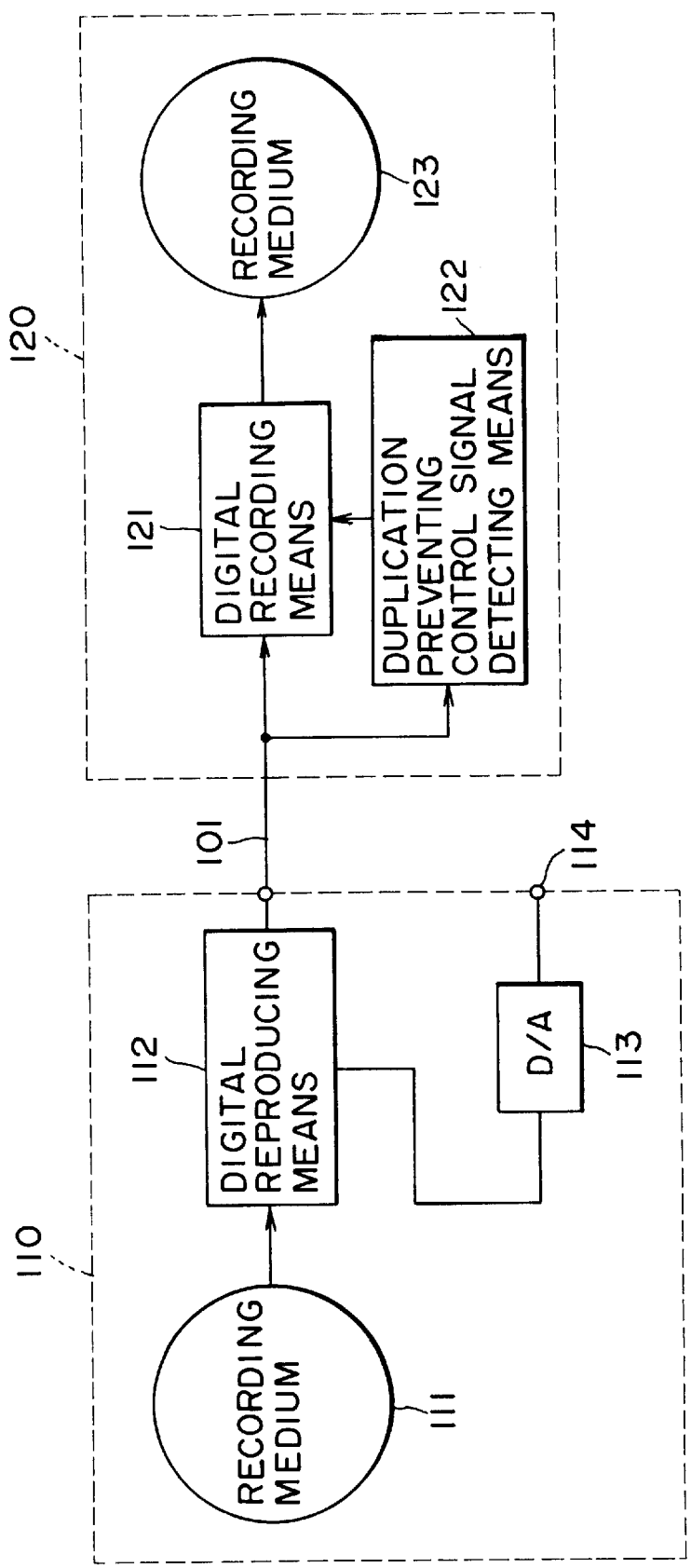
FIG. 1 is a block diagram for explaining a structure of a duplication preventing control system of the related art.
Figure 2:
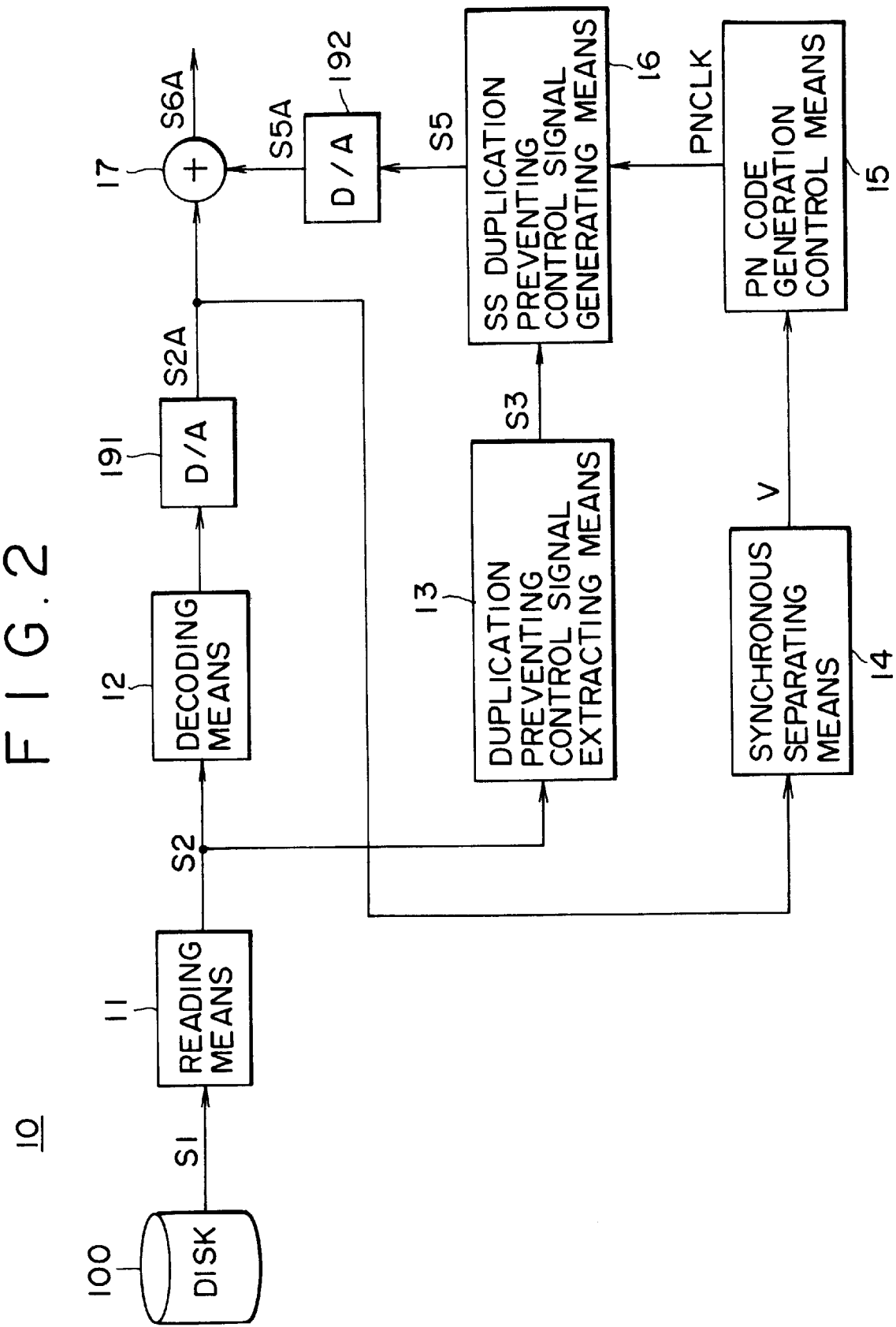
FIG. 2 is a block diagram for explaining a preferred embodiment of an image signal outputting apparatus of the present invention.

FIG. 2 is a diagram for explaining an image signal output apparatus (hereinafter referred to only as output apparatus) 10 used in the image signal duplication control system of the first embodiment of the present invention. Namely, an output apparatus 10 corresponds to the regenerating system of the DVD apparatus of this first embodiment.

In FIG. 2, a recording medium 100 is a DVD, in this example, to which a digital image signal and digital voice signal are recorded and moreover a duplication preventing control signal is also recorded as an additional information. The duplication preventing control signal may be recorded in the TOC (Table of Contents) at the inner most are of the disk or in the track area called directory and may also be inserted or recorded to different area from the recording area of the track where the image data and voice data are recorded. The example explained below is applied to the latter recording manner. In this case, the duplication preventing control signal is also read simultaneously.

Moreover, the duplication preventing control signal may have the content to give limitation for recording generation for allowing only the duplication of the first generation or may have the content to inhibit or allow duplication of the image signal. Here, it is assumed that the duplication preventing control signal is formed of one bit or several bits.

Moreover, in the first embodiment, the signal recorded in the recording medium 100 is conforming to the standard specification for compression system of the image signal. For example, the signal is compressed and recorded, for example, using MPEG2.

As shown in FIG. 2, the output apparatus 10 of this embodiment is provided with a reading means 11, a decoding means 12, a duplication preventing control signal extracting means 13, a synchronous separating means 14, a PN code generation controlling means 15, an SS (abbreviation of spread spectrum) duplication preventing control signal generating means 16, an adding means 17 and D/A converting circuits 191, 192.

The reading means 11 extracts the reproduced image signal element S2 from the signal S1 obtained by regenerating a recording medium 100 and then supplies this signal element S2 to the decoding means 12 and duplication preventing control signal extracting means 13.

The encoding means 12 executes the decoding process for the reproduced image signal element S2 to form a digital image signal and then supplies this signal to the D/A converting circuit 191. The D/A converting circuit 191 executes the D/A conversion for the digital image signal to form an analog image signal S2A having a synchronous signal and then supplies this signal S2A to the synchronous separating means 14 and adding means 17.

The duplication preventing control signal extracting means 13 extracts the duplication preventing control signal S3 added to the reproduced image signal element S2 and then supplies this signal S3 to the SS duplication preventing control signal generating means 16.

Meanwhile, the synchronous separating means 14 extracts a vertical synchronous signal V from the analog image signal S2A and then supplies this signal V to the PN code generation controlling means 15A.

The PN code generation controlling means 15 uses the vertical synchronous signal V as the reference signal to generate the PNcode generation clock signal PNCLK and various timing signals used for generation of the PN code.

Figure 3:
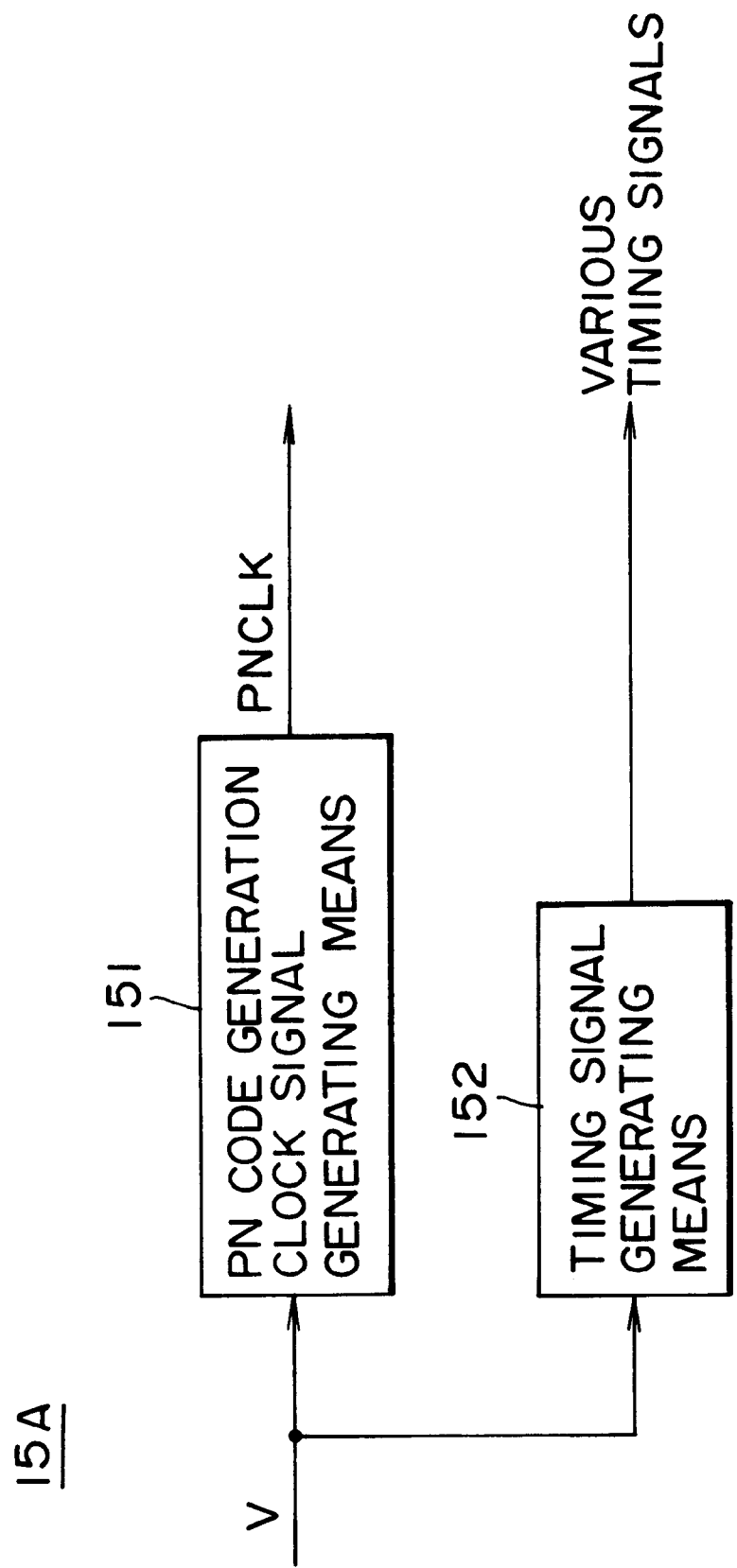
FIG. 3 is a block diagram for explaining an example of a PN code generation control means of the image signal output apparatus shown in FIG. 2.

FIG. 3 is a block diagram for explaining the PN code generation controlling means 15A of this embodiment. The PN code generation controlling means 15A comprises a PN code generation clock signal generating means 151A and a timing signal generating means 152A and the vertical synchronous signal V from the synchronous separating means 14 is supplied to such means.

The PN code generation clock signal generating means 151A uses the vertical synchronous signal V as the reference signal to generate the PN code generation clock signal PNCLK for generating the PN code for spreading to be used for the spectrum spread.

Figure 4:
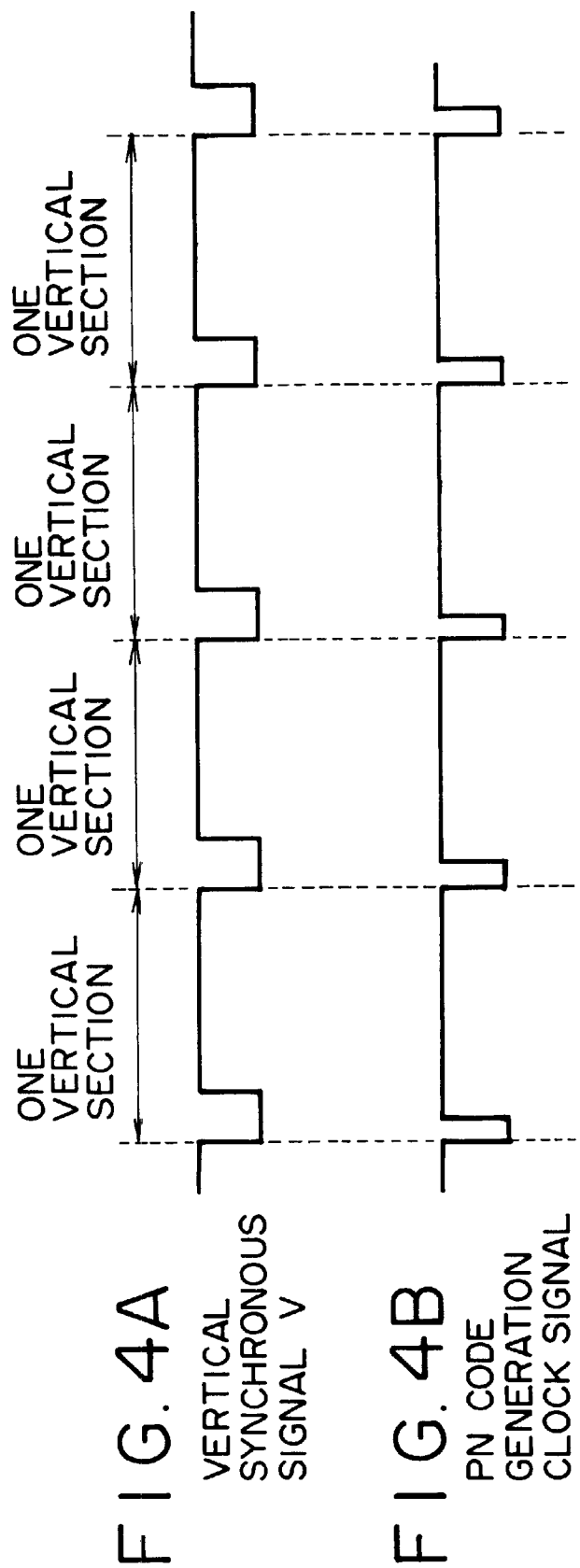
FIG. 4 is a diagram for explaining an example of the PN code generation clock signal generated by the image output apparatus shown in FIG. 1.

FIG. 4 is a diagram for explaining an example of the PN code generation clock signal PNCLK generated in the PN code generation clock signal generating means 151A. As shown in FIG. 4, in this embodiment, the PN code generation clock signal PNCLK is generated with reference to the front edge (rising edge) of the vertical synchronous signal V (FIG. 4A)

As will be explained later, with reference to the falling edge of this PN code generation clock signal PNCLK (FIG. 4B), the PN code in which one chip section is formed by one clock period, namely by one vertical section (one field) in this case is generated. In this specification, one clock of the PN code generation clock signal PNCLK is called one chip.

The timing signal generating means 152A generates various timing signals to be used by the output apparatus 10 on the basis of the vertical synchronous signal V.

The PN code generation clock signal PNCLK generated in the PN code generation control means 15A is then supplied to the SS duplication preventing signal generating means 16.

The SS duplication preventing control signal generating means 16 executes the spectrum spread for the duplication preventing control signal S3 extracted by the duplication preventing control signal extracting means 13 using the PN code stream to form the spread spectrum duplication preventing control signal (hereinafter referred to as the SS duplication preventing control signal) S5 to be superimposed to the image signal S2A.

Figure 5:
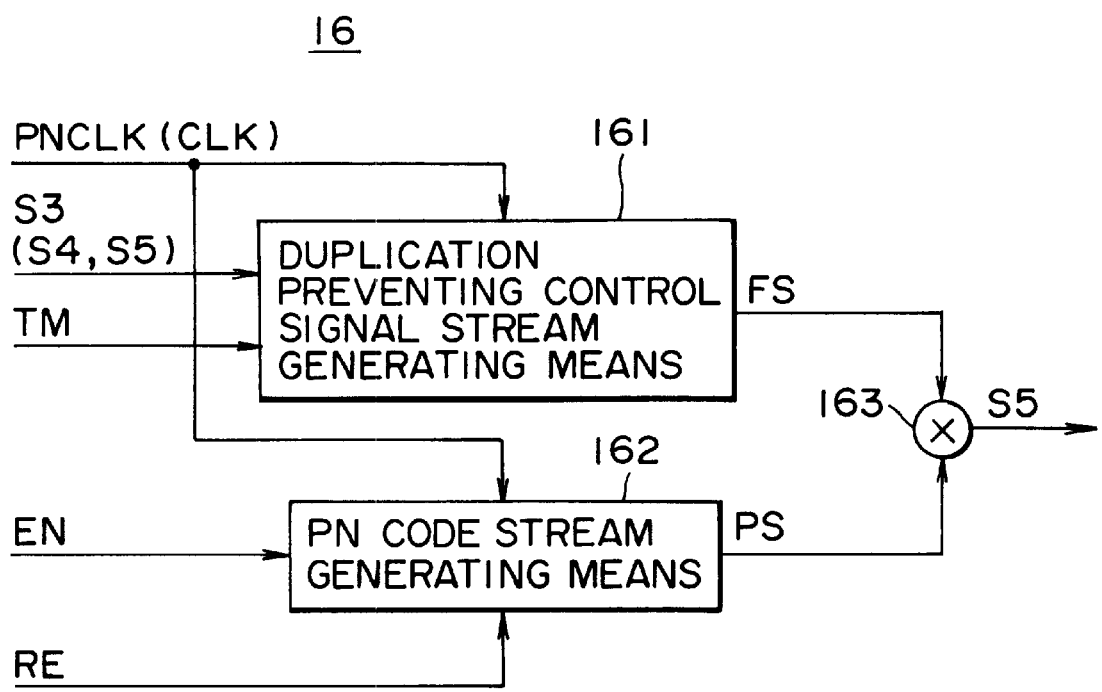
FIG. 5 is a diagram for explaining an example of an SS duplication preventing control signal generating means of the image signal output apparatus shown in FIG. 1.

FIG. 5 is a block diagram for explaining the SS duplication preventing control signal generating means 16. As shown in FIG. 5, the SS duplication preventing control signal generating means 16 is provided with a duplication preventing control signal generating means 161, a PN code stream generating means 162 and a multiplying circuit 163.

To the duplication preventing control signal stream generating means 161, the duplication preventing control signal S3 from the duplication preventing control signal extracting means 15, timing signal TM and PN code generation clock signal PNCLK are supplied. In this case, the timing signal TM indicates the timing for individually separating one bit of the duplication preventing control signal S3.

The duplication preventing control signal stream generating means 161 outputs the duplication preventing control signals S3 as many as the predetermined number of clocks for every one bit to produce the duplication preventing control signal stream FS and then supplies this signal stream to a multiplying circuit 163.

To the PN code stream generating means 162, the PN code generation clock signal PNCLK, enable signal EN and reset signal RE are supplied. The enable signal EN causes the PN code stream generating means 162 to operate and this signal is produced when the power supply of the output apparatus 10 is turned ON and is then supplied to the PN code stream generating means 162.

The PN code stream generating means 162 becomes ready for operation depending on the enable signal EN. The PN code stream generating means 162 produces, for each edge, for example, of the reset signal RE, the PN code stream PS of the predetermined code pattern depending on the PN code generation clock signal PNCLK from the beginning.

As explained above, the reset signal RE is used to generate the PN code stream of the predetermined code pattern from the beginning. In the case of this embodiment, the reset signal RE is supplied to the PN code stream generating means 162 for each appearance of the frame called as I picture (Intra-coded picture) and thereby generation of the PN code stream of the predetermined code pattern is repeated.

Namely, the image signal recorded on the recording medium 100 includes the above-mentioned I picture inserted in the constant period. The I picture has been formed by direct encoding of the image signal of one frame without use of the predictive encoding and this I picture forms the image signal recorded in the disk 100 together with the P picture (Predictive-coded picture) and B picture (Bidirectionally-coded picture) which are formed utilizing the motion compensating prediction. In this embodiment, the I picture has been used to instruct the reset timing for starting generation of the PN code stream.

Figure 6:
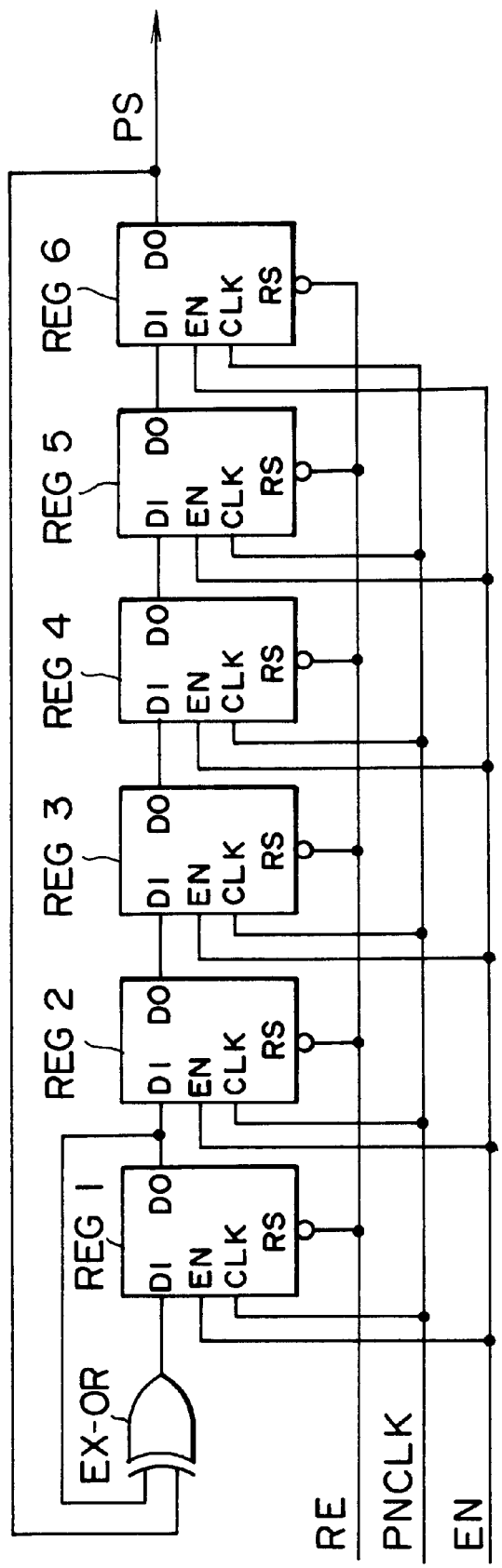
FIG. 6 is a diagram for explaining an example of the PN code generator used in t he SS duplication preventing control signal generating means of the image signal output apparatus shown in FIG. 1.

FIG. 6 shows a structure example of the PN code stream generating means 162. The PN code stream generating means 162 of this example is consisting of six D-Flip-flops REG1 to REG6 forming the shift register of six stages and an exclusive OR circuit EX-OR for calculating adequate tap output of this shift register. The PN code stream generating means 162 shown in FIG. 5 generates, as explained above, enable EN, PN code generation clock signal PNCLK and also the PN code stream PS of M series depending on the reset signal RE. The PN code stream PS produced by the PN code stream generating means 162 is supplied to the multiplying circuit 163.

Figure 7:
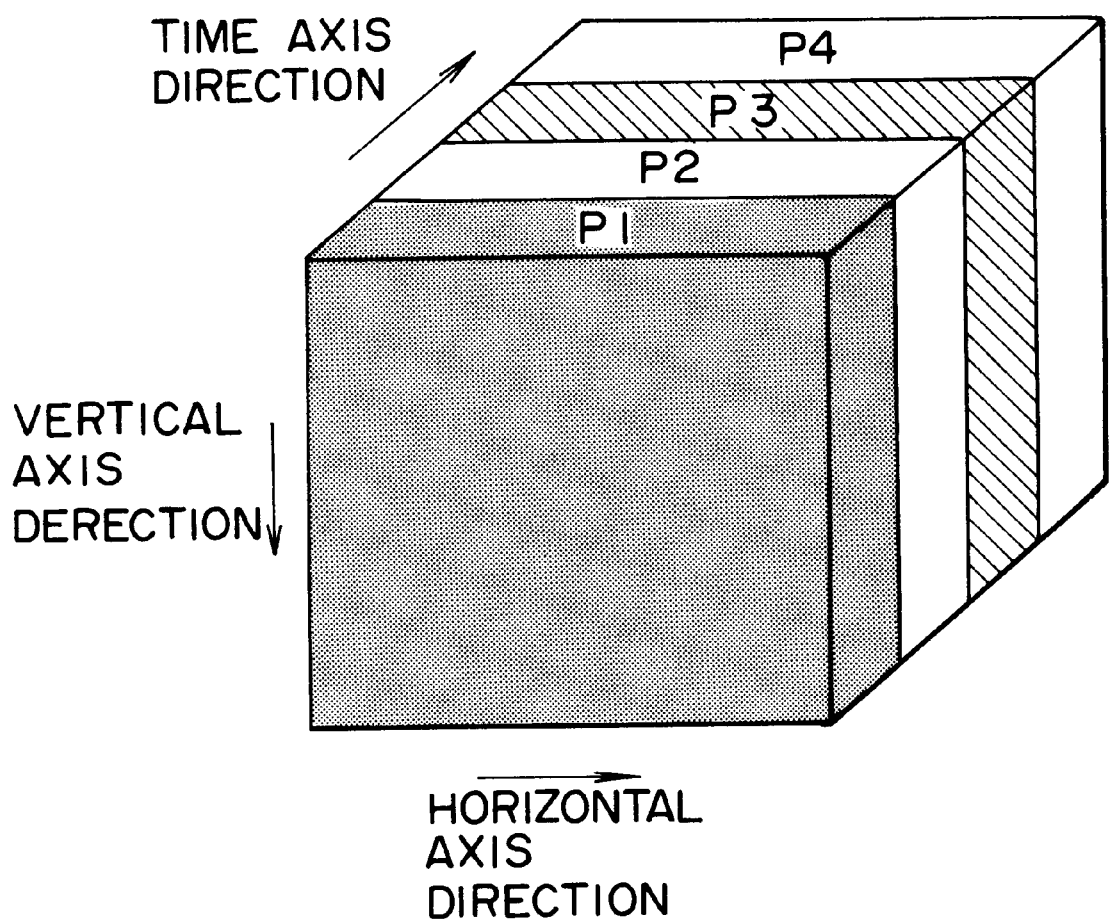
FIG. 7 is a conception diagram for explaining the generating condition (mapping) of the PN code used in the image signal output apparatus shown in FIG. 1.

FIG. 7 is a diagram for explaining the generating condition of the PN code generated by the PN code stream generating means 162, namely the mapping of the PN code for the image signal. As is explained above, in this embodiment, the PN code stream generating means 162 generates the PN code of one chip for every one vertical section on the basis of the PN code generation clock signal PNCLK. That is, the PN code of one clock period is generated for every one vertical section using the PN code generation clock PNCLK as the clock signal.

Thereby, the data stream consisting of different PN codes P1, P2, P3, P4, . . . is formed for every one vertical section in the time axis direction in unit of frame (hereafter, referred to only as time axis direction).

Moreover, in this embodiment, as explained above, since the PN code stream of the same code pattern is repeatedly produced, the PN code stream PS consisting of the PN code forming one chip in one vertical section is produced defining the period from the I picture to the next I picture as one period. In conception, different PN codes P1, P2, P3, P4, . . . are produced in every one vertical section and a plane consisting of the same PN code is formed in one vertical section.

When the PN code stream PS produced by the PN code stream generating means 162 is superimposed, for example, in direct to the image signal and noise reduction is performed by utilizing the correlation in the horizontal direction and correlation in the vertical direction of the image signal as explained above, since the PN code superimposed to the image signal is not detected as difference element even if difference is detected between the adjacent pixels or adjacent horizontal scanning lines in one vertical section, the PN code stream PS is never eliminated when the processing for eliminating the difference obtained by defining it as noise.

Moreover, even when image is compressed or enlarged using so-called zoom mode or the image display size is changed by executing the image conversion to change the image size formed by the image signal in the so-called wide mode, cinema mode and the standard mode as explained above, the PN code forming one chip with one vertical section superimposed in every one vertical section is never changed.

Moreover, even when the image is partially used in such a manner that a part of the image formed by the image signal to which the PN code stream PS is superimposed is cut out for use, the PN code superimposed to the image signal forming the cutout image is never changed. In addition, when unwanted part of the image is cut out and only the required image is used, namely even when the image is partially deleted, the PN code superimposed to the image signal forming the image after the image is partially deleted is never changed.

As explained, in this embodiment, when the PN code stream PS is superimposed to the image signal and even when noise reduction utilizing correlation in the horizontal and vertical directions of the image signal, enlargement and compression of image formed by the image signal to which the PN code is superimposed, conversion of display size of the image and partial use or partial deleting of image are executed, the PN code (data) on the data plane consisting of the PN codes P1, P2, P3, P4, . . . formed in every one vertical section in the time axis direction is never changed.

In addition, the multiplying circuit 163 generates, on the basis of the PN code generation clock signal PNCLK, the SS duplication preventing control signal S5 by spectrum spread of the duplication preventing control signal stream FS using the PN code stream PS consisting of the PN codes generated considering one vertical section as one chip as explained above.

The SS duplication preventing control signal S5 formed by the SS duplication preventing control signal generating means 16 is supplied to the D/A converting circuit 192. D/A converting circuit 192 converts the SS duplication preventing control signal S5 into the analog SS duplication preventing control signal S5A to supply to the adding means 17.

The adding means 17 superimposes the analog SS duplication preventing control signal S5A to the analog image signal S2A to form an output image signal S6A and then outputs this signal. As explained above, the adding means 17 has a function as a superimposing means which superimposes, to the analog image signal S2A, the SS duplication preventing control signal 5A which is the duplication preventing control signal having been subjected to the spectrum spread by the PN code stream PS.

As explained, the SS duplication preventing control signal S5 formed through spectrum spread by the PN code stream PS consisting of the PN codes produced considering one vertical section one chip is superimposed to the output image signal S6A. Therefore, within one vertical section of the image signal, the same SS duplication preventing control signal S5 is superimposed.

Thereby, even when noise reduction utilizing the correlation in the. horizontal and vertical directions of the image signal, enlargement or compression of image, conversion of image display size, partial use of image and partial deletion of image are executed, the SS duplication preventing control signal S5 superimposed to each vertical section of the image signal to which the SS duplication preventing control signal S5 is never changed.

Next, the second embodiment of the image signal output apparatus of the present invention will then be explained.

Figure 8:
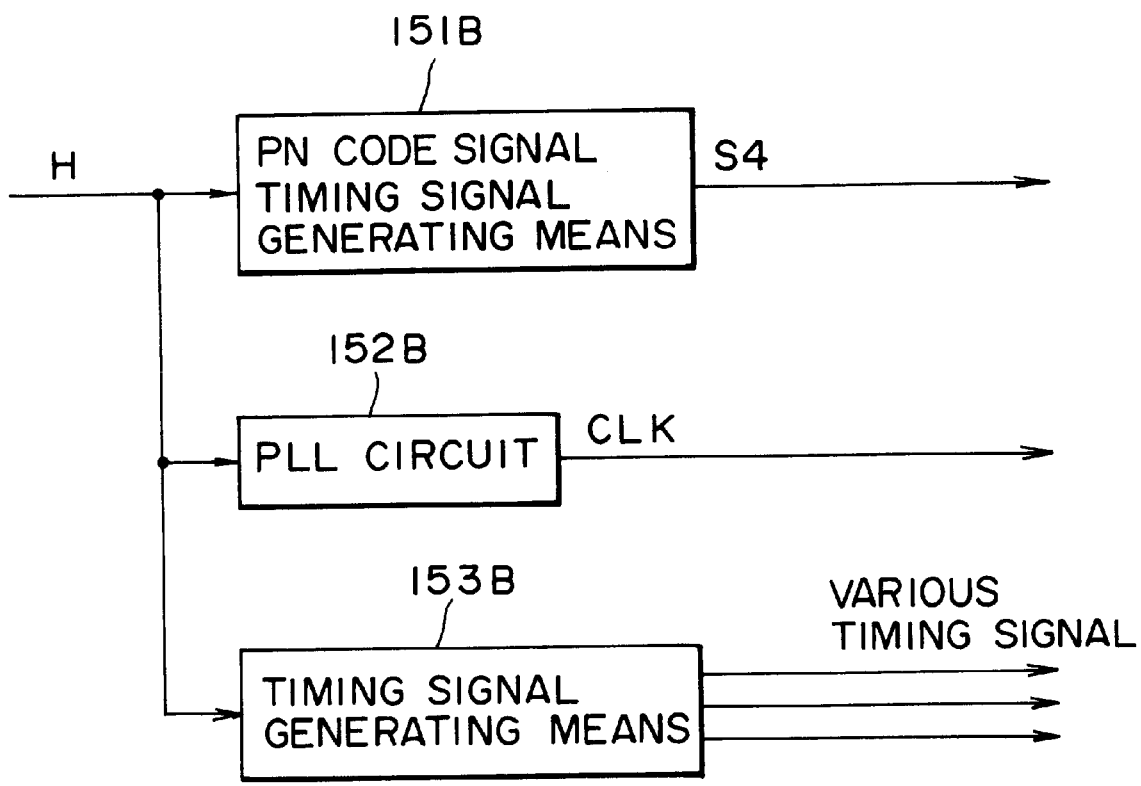
FIG. 8 is a block diagram for explaining a PN code generation control means of the image signal output apparatus of the second embodiment of the present invention.

FIG. 8 is a block diagram for explaining a PN code generation control means 15B used in this embodiment. As shown in FIG. 8, the PN code generation control means 15B of this embodiment comprises a PN code generation timing signal generating means 151B, a PLL circuit 152B and timing signal generating means 153B and a horizontal synchronous signal H is supplied to these elements from the synchronous separating means 14.

The PN code generation timing signal generating means 151B uses the horizontal synchronous signal H as the reference signal to generate the PN code generation timing signal S4 for providing the timing for starting generation of the PN code stream for spread used for spectrum spread.

Figure 9:
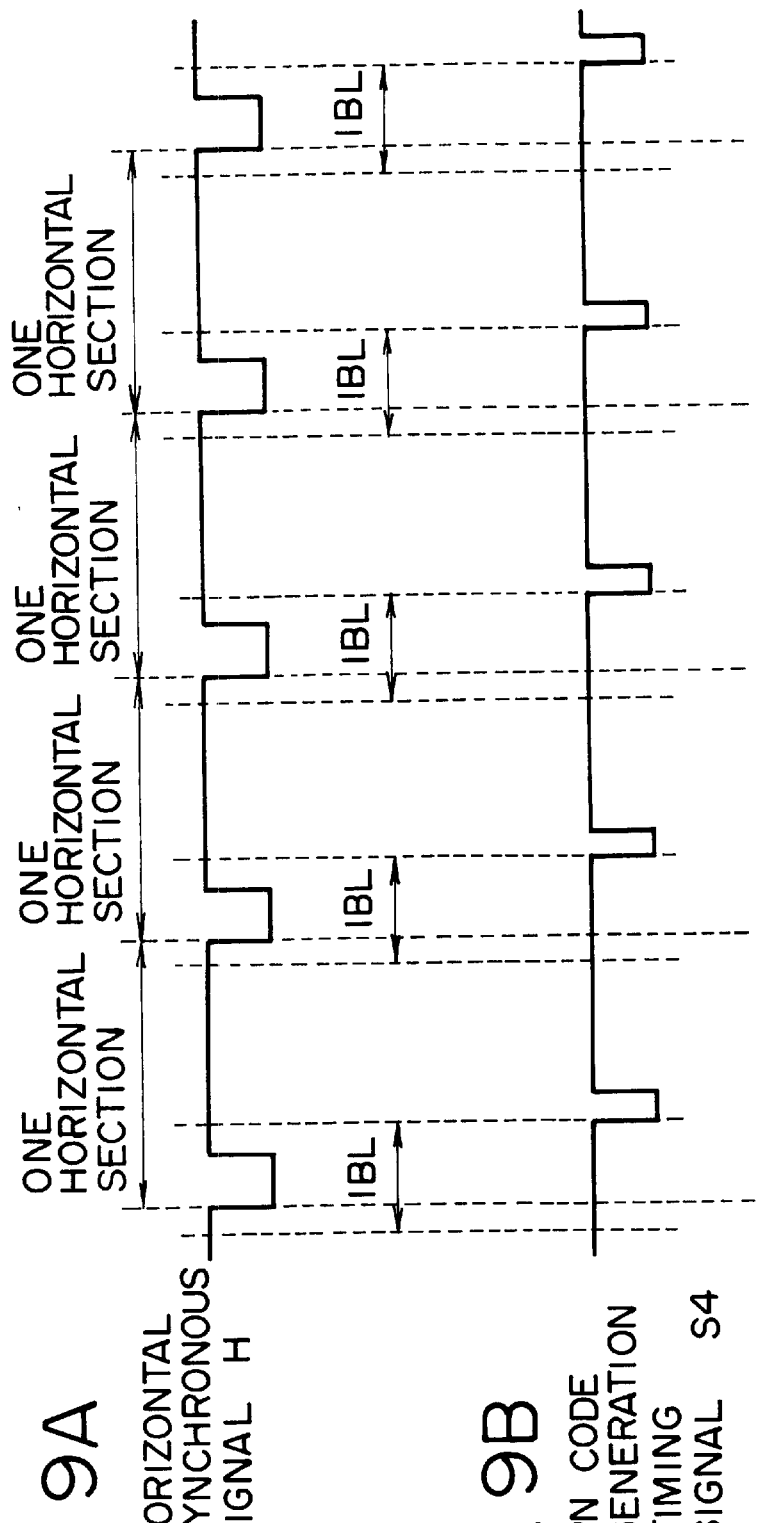
FIG. 9 is a diagram for explaining a PN code generation timing signal generated by the image signal output apparatus shown in FIG. 8.

FIG. 9 is a diagram for explaining an example of the PN code generation timing signal S4 produced in the PN code generation timing generating means 151B in this embodiment. As shown in FIG. 9, in this embodiment, the PN code generation timing signal S4 is generated with reference to the front edge (rising edge) of the horizontal synchronous signal H.

This PN code generation timing signal S4 provides the timing for generating, from the leading code, in every horizontal section, the PN code stream of the predetermined code pattern corresponding to the effective image section except for the horizontal blanking period HBL.

The PLL circuit 152B produces the clock signal CLK synchronized with the horizontal synchronous signal H depending on the horizontal synchronous signal H. Moreover, the timing signal generating means 153B produces various timing signals used in this image signal output apparatus 10 depending on the horizontal synchronous signal H.

The PN code generation timing signal S4 and clock signal CLK produced by the PN code generation controlling means 15B are supplied to the duplication preventing control stream generating means 161 of the SS duplication preventing control signal generating means 16 of FIG. 5 explained in regard to the first embodiment.

To the duplication preventing control signal stream generating means 161, the duplication preventing control signal S3 from the duplication preventing control signal extracting means 15, timing signal TM and clock signal CLK are supplied. In this case, the timing signal instructs the timing for separating every one bit of the duplication preventing control signal S3.

Like the first embodiment, the duplication preventing control signal stream generating means 161 outputs the duplication preventing control signals S3 in every one bit as many as the predetermined number of clocks to produce the duplication preventing control signal stream FS and then supplies this signal stream to the multiplying circuit 163. In the second embodiment, the duplication preventing control signal S4 produces a low bit duplication preventing control signal stream FS of one bit to several bits which instructs inhibit of duplication or acknowledgment of duplication so that this signal is completed in every effective image section of one horizontal section.

To the PN code stream generating means 162, the clock signal CLK, enable signal EN and PN code generation timing signal S4 are supplied. The enable signal EN sets the PN code stream generating means 162 to the operating condition. The PN code stream generating means 162 produces the PN code stream PS, from the first code thereof, of the predetermined code pattern depending on the clock signal CLK in every falling edge of the PN code generation timing signal S4.

In the second embodiment, the PN code stream PS defines the effective image section in every one horizontal section as one period. As explained above, the PN code stream generating means 162 produces, in every horizontal section, the PN code stream PS defining the section in one horizontal section as one period.

Figure 10:
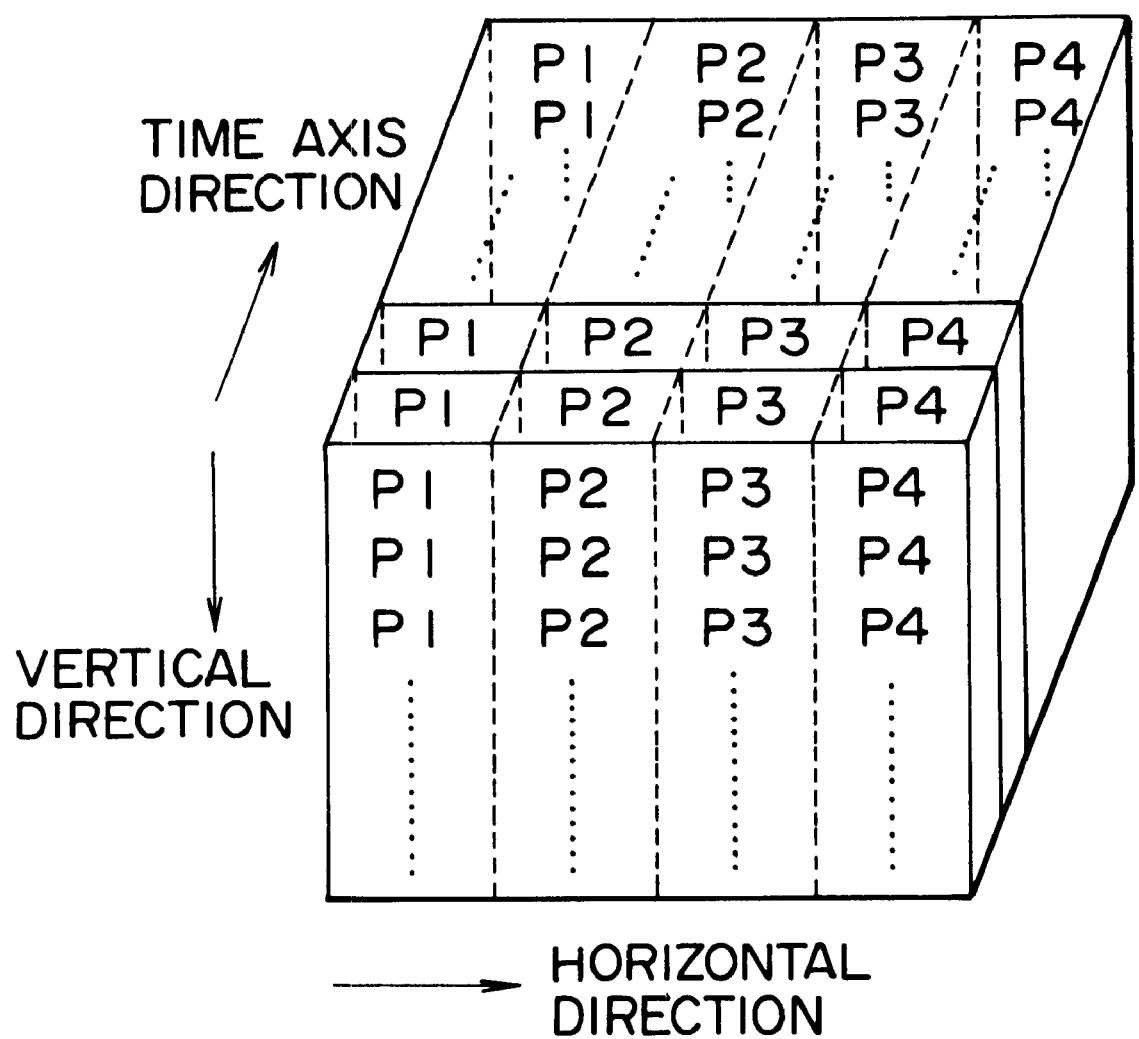
FIG. 10 is a conception diagram for explaining the generating condition (mapping) of the PN code used in the image signal output apparatus of the second embodiment of the present invention.

FIG. 10 a diagram for explaining the generating condition of the PN code generated by the PN code stream generating means 162 in the second embodiment, namely the mapping of the PN code for the image signal. As is already explained above, in this embodiment, the PN code stream generating means 162 produces the PN code stream PS defining one period with the effective image section in one horizontal section. Explained here is an example where the PN code of four chips are generated in the effective image section of one horizontal section for simplifying the explanation.

As shown in FIG. 10, the PN code stream generating means 162 produces, in this example, the PN code stream PS consisting of the PN codes P1, P2, P3, P4 corresponding to the effective image section of one horizontal section. The PN code stream PS is repeatedly produced in the same timing in each horizontal section forming a frame depending on the PN code generation timing signal S4 and clock signal CLK.

Thereby, as shown in FIG. 10, the data stream consisting of the same PN codes in the vertical direction like the data stream consisting of the PN code P1, data stream consisting of PN code P2, data stream consisting of PN code P3 and data stream consisting of PN code P4 are formed in the vertical direction.

Moreover, since the PN code stream PS is repeatedly produced in every one horizontal section even if it exceeds one field, the data stream consisting of the same PN code is also produced in the time axis direction as shown in FIG. 10. Thereby, the data stream consisting of the same PN code is formed in the vertical direction and time axis direction of the image formed by the image signal. Accordingly, in concept, as shown in FIG. 10, four planes formed by the PN codes P1, P2, P3, P4 are formed in each frame in the case of this example.

Thereby, when the PN code stream PS is superimpose, for example, in direct to the image signal and when the noise reduction is performed, as explained above, utilizing the correlation of the image signal, if difference is extracted between the adjacent horizontal scanning lines, adjacent fields and between adjacent frames, since the PN code stream PS consisting of the PN codes P1, P2, P3, P4 is not detected as the difference, the PN code stream PS is not eliminated even when the difference obtained is removed by considering it as noise.

Moreover, as explained above, when the image is enlarged in the vertical direction or the image signal of the NTSC system is converted to the image signal of the PAL system, the horizontal scanning lines forming the image are interpolated. In this case, as the horizontal scanning lines used for interpolation, the horizontal scanning lines near the interpolation position are used. Therefore, like the other horizontal scanning lines, the PN code stream PS is superimposed to the interpolated horizontal scanning lines and the horizontal scanning lines not having the PN code stream PS are never generated.

Moreover, even when the horizontal scanning lines to form the image are curtailed as in the case where the image signal of PAL system is converted into the image signal of the NTSC system, such deterioration of the PN code stream as partial deletion of the PN code stream PS is never generated.

In this second embodiment, if the noise reduction utilizing correlation of the image signal, interpolation or curtailment of the horizontal scanning line are executed, the PN code stream PS not generating a change of data on the data plane shown in FIG. 10 can be produced.

The multiplying circuit 163 spreads the spectrum of the duplication preventing control signal stream PS using the PN code stream PS produced as explained above to form the SS duplication preventing control signal S5. As explained, the duplication preventing control signal S3 is supplied to the multiplying circuit 163 as the duplication preventing control signal stream FS which is to be completed within the effective image section of one horizontal section and this signal FS is spectrum spread to be completed by the PN code stream PS of one period.

Namely, even when the duplication preventing control signal S indicates details of content of the duplication preventing control with one bit or with a plurality of bits like 2 bits or 3 bits, the spectrum spread is executed using the PN code stream PS of one period. As explained above, since the duplication preventing control signal S3 is spectrum spread to be completed by the PN code stream PS of one period, the same SS duplication preventing control signal S5 is formed corresponding to the effective image section in each horizontal section.

Like the first embodiment, the SS duplication preventing control signal S5 formed by the SS duplication preventing control signal generating means 16 is converted to the analog SS duplication preventing control signal S5A in the D/A converting circuit 192 and then superimposed to the analog image signal S2A in the adding means 17 to produce an output image signal 6A.

The adding means 17 superimposes the analog SS duplication preventing control signal S5A to the analog image signal S2A to form an output image signal S6A and then outputs this signal. As explained, the adding means 17 has a function as the superimposing means for superimposing, to the analog image signal S2A, the SS duplication preventing control signal SSA which is the duplication preventing control signal spectrum spread by the PC code stream PS.

Thereby, the same SS duplication preventing control signal S5 is repeatedly superimposed to the effective image section between each horizontal section in the vertical and time axis directions of the image formed by the image signal S6 to which the SS duplication preventing control signal is superimposed. Therefore, the same SS duplication preventing control signal S5 spectrum spread by the PN code generated in the same manner in each horizontal section of all frames is superimposed, as explained in regard to FIG. 6, to each horizontal section of all frames formed by the image signal S6.

In this case, even when the noise reduction utilizing correlation between the adjacent horizontal scanning sections or fields or frames, curtailment and interpolation of the horizontal scanning lines for compression or enlargement in the vertical direction of the image, curtailment or interpolation thereof in the time axis direction namely curtailment or interpolation of frame are executed, the data stream, which may allows increase or decrease in number of data of the SS duplication preventing control signal in the vertical direction and time axis direction of the image formed by the image signal to which the SS duplication preventing control signal is superimposed but any change of contents, can be formed.

As explained, even when noise reduction of the image signal utilizing correlation of image signal, interpolation and curtailment of the horizontal scanning lines or frames are executed, the SS duplication preventing control signal is still superimposed, without any change, to each horizontal section of all frames formed by the image signal after the noise reduction, interpolation and curtailment of the horizontal scanning line and frame.

Next, the third embodiment of the image signal output apparatus of the present invention will be explained.

Figure 11:
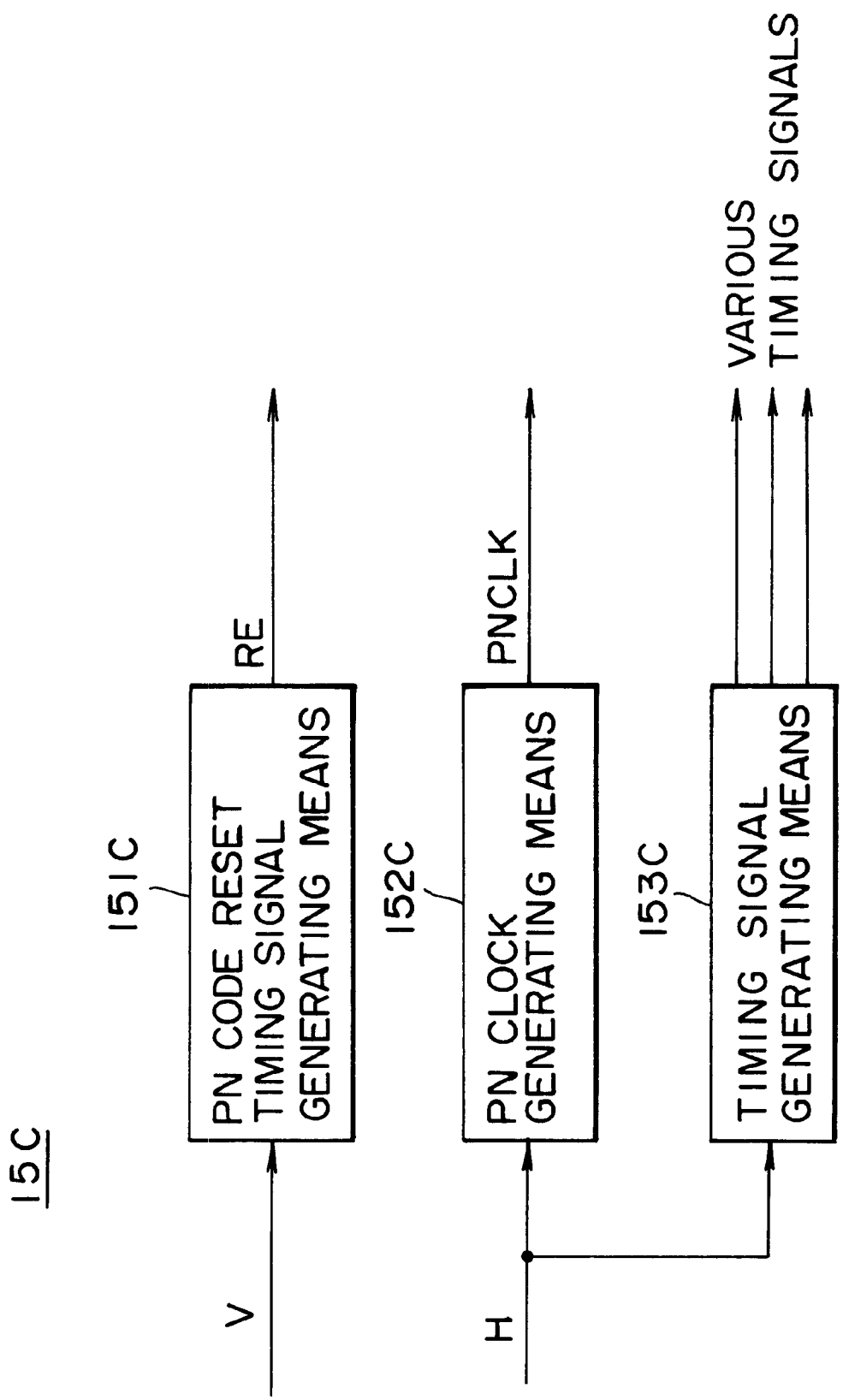
FIG. 11 is a block diagram for explaining the PN code generation control means of the image signal output apparatus of the third embodiment of the present invention.

FIG. 11 is a block diagram for explaining the PN code generation controlling means 15C of this embodiment. As shown in FIG. 11, the PN code generation controlling means 15C of this embodiment is provided with a PN code reset timing signal generating means 151C, a PN clock generating means 152C and a timing signal generating means 153C. The vertical synchronous signal V is supplied to the PN code reset timing signal generating means 151C from the synchronous separating means 14, while a horizontal synchronous signal H is supplied to the timing signal generating means 153C from the synchronous separating means 14.

The PN code reset timing signal generating means 151C uses the vertical synchronous signal V shown in FIG. 13A as the reference signal to produce the reset signal RE (refer to FIG. 12B) of the vertical period to determine the repetition frequency of the PN code for spread to be used for the spectrum spread. In this example, the reset signal RE is the signal of vertical period which rises at the front edge of the vertical synchronous signal V.

Figure 12:
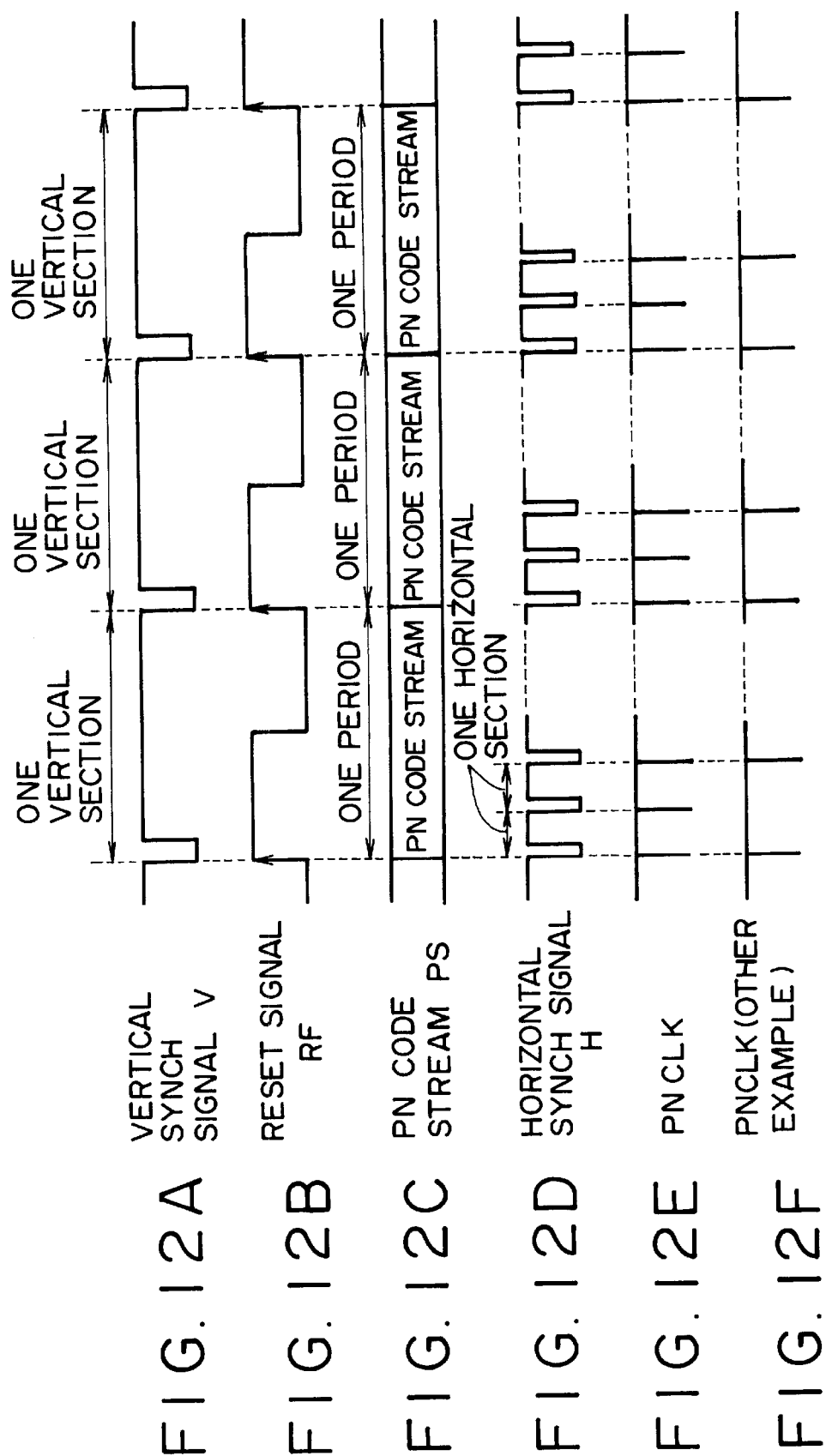
FIG. 12 is a diagram for explaining the PN code generation timing signal generated by the image signal output apparatus shown in FIG. 11.

The PN clock generating means 152C produces the PN clock PNCLK synchronized with the horizontal synchronous signal H shown in FIG. 12D. This PN clock PNCLK determines the chip period of the spread code. In this embodiment, the PN clock PNCLK of the horizontal period is produced as shown in FIG. 12E.

Moreover, the timing signal generating means 153C produces various timing signals used in this output apparatus 10 on the basis of the horizontal synchronous signal H.

The PN code reset timing signal RE, PN clock signal PNCLK produced by the PN code generation controlling means 15C are supplied to the duplication preventing control stream generating means 161 of the SS duplication preventing control signal generating means 16 of FIG. 5 explained in regard to the first embodiment.

To the duplication preventing control signal stream generating means 161, the duplication preventing control signal S4 from the duplication preventing control signal extracting means 15, timing signal TM and PN clock signal PNCLK are supplied. In this case, the timing signal TM instructs the timing for separation of every one bit of the duplication preventing control signal 54.

Like the first embodiment, the duplication preventing control signal stream generating means 161 produces the duplication preventing control signal stream FS by outputting the duplication preventing control signal S4 as many as the predetermined number of clocks in every one bit and then supplies this signal stream FS to the multiplying circuit 163. In this third embodiment, the duplication preventing control signal stream generating means 161 produces the low bit duplication preventing control signal stream FS of one bit to several bits to be completed within one vertical section to instruct inhibit of duplication or acknowledgment of duplication.

To the PN code stream generating means 162, the clock signal CLK, enable signal EN and PN code reset timing signal RE are supplied. The enable signal EN sets the PN code stream generating means 162 to the operating condition.

The PN code stream generating means 162 is reset for every rising edge of the PN code reset timing signal RE to produce the PN code stream PS of the predetermined code pattern, from the first code thereof, depending on the PN clock signal PNCLK. Namely, the PN code stream PS is repeated for one vertical period as shown in FIG. 3C and thereby one chip is assigned to one horizontal section.

The clock rate of the clock PNCLK supplied to the PN code stream generating means 162 is 15.734 kHz which is equal to the horizontal frequency when the image signal is that of the NTSC system. In this case, 255 chips are inserted in one vertical section.

Figure 13:
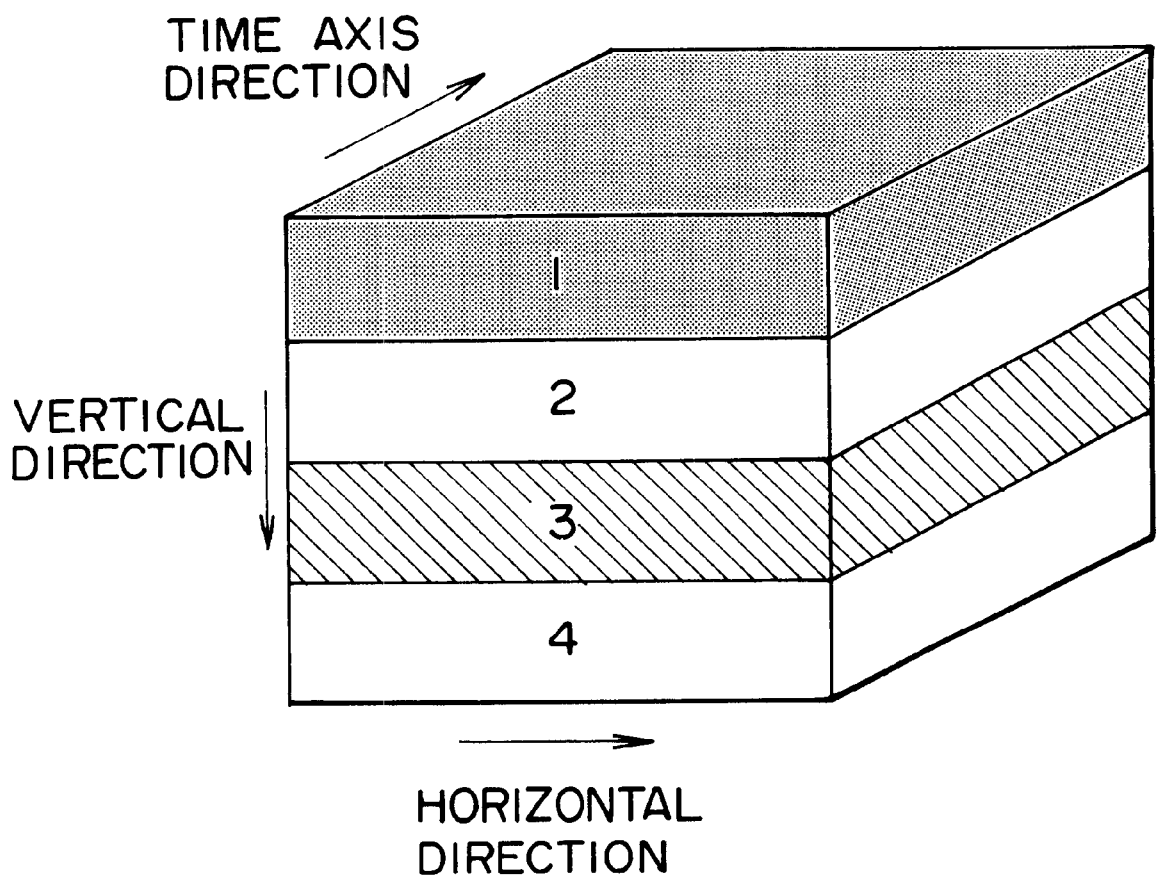
FIG. 13 is a conception diagram for explaining the generating condition (mapping) of the PN code used in the image signal output apparatus of the third embodiment of the present invention.
Figure 14A:
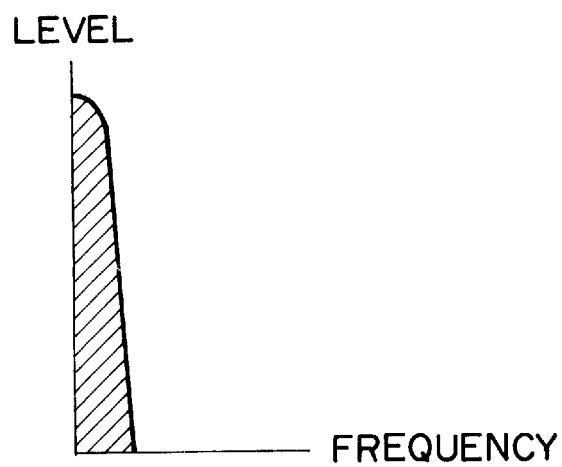
FIG. 14 is a diagram showing the relationship between the SS duplication preventing control signal and information signal using vectors.
Figure 14B:
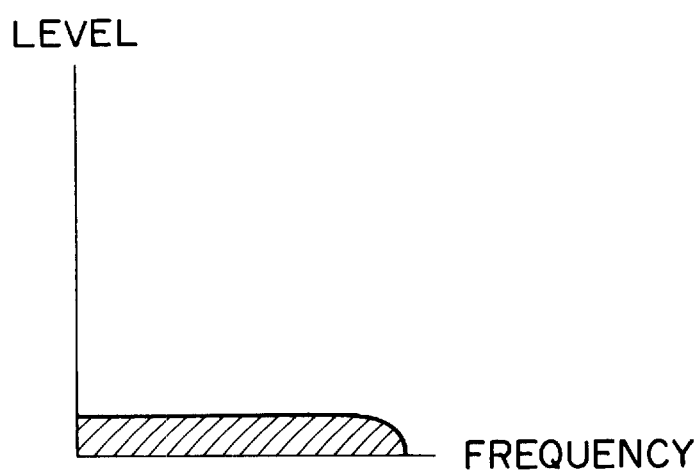
Figure 14C:
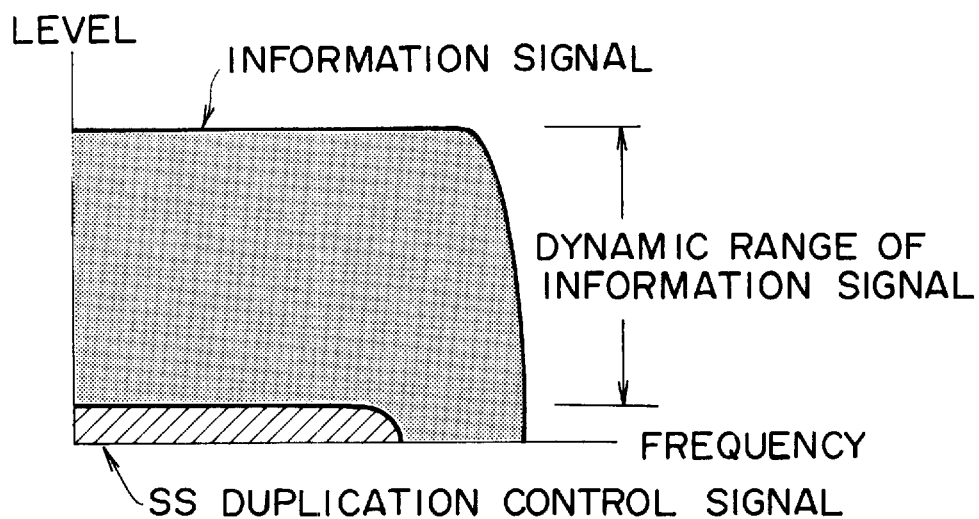
Figure 14D:
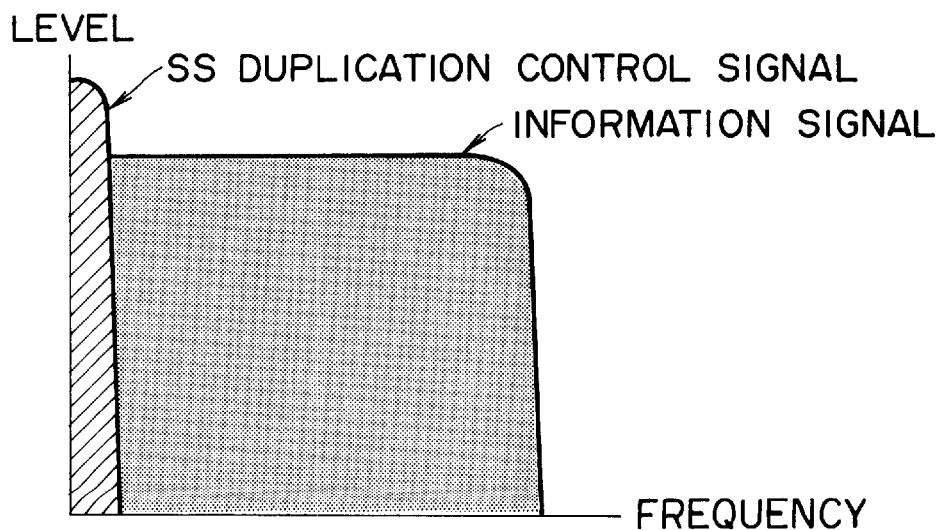

FIG. 13 is a diagram for explaining the generating condition of the PN code generated by the PN code stream generating means 162, namely the mapping of the PN code for the image signal in the third embodiment. As explained above, in this embodiment, the PN code stream generating means 162 produces the PN code stream PS generating one chip in one horizontal section by defining one vertical section as one period.

In FIG. 13, one vertical section is formed of four horizontal sections for simplifying the explanation. As shown in FIG. 13, the PN code stream generating means 162 produces, in this example, the PN code stream PS consisting of the chips 1, 2, 3, 4 having different data, corresponding to each horizontal section in one vertical section. This PN code stream PS is repeated produced in the same manner with the same timing in each field (vertical section), depending on the PN code reset timing signal RE and clock signal PNCLK.

Thereby, as shown in FIG. 13, the chips having different data are generated in the vertical direction in unit of one horizontal section but the same one chip is generated in the horizontal direction. Moreover, the chips having the same data are repeatedly arranged also in the time axis direction. Since the duplication preventing control signal is completed in one vertical section, as the SS duplication preventing control signals, four planes forming the same chips in both horizontal direction and time axis direction are generated, in conception, in this example as shown in FIG. 6.

Therefore, when this PN code stream PS is superimposed, for example, to the image signal in direct and the noise reduction utilizing the correlation of the image signal is performed as explained above, since the PN code stream PS consisting of the PN code chips 1, 2, 3, 4 is not detected as the difference even when a difference is obtained between the adjacent fields or adjacent frames, the PN code stream PS is never eliminated if the noise reduction is executed by considering such difference obtained as noise.

Moreover, as explained above, when the image is enlarged or compressed in the horizontal direction, the pixels are deleted or interpolated. However, since one chip having the same data is assigned in the horizontal direction, the original PN data is never lost if the pixel data in the horizontal direction is deleted or interpolated.

In addition, if the field curtailment or field interpolation is executed, since the chip having the same data is also produced in the time axis direction, the original data is not lost and remains as it is.

As explained, in this embodiment, even if the noise reduction utilizing correlation of image signal and curtailment or interpolation in the horizontal direction and vertical direction are performed, the PN code stream PS which does not show any change of data on the data plane shown in FIG. 13 can be produced.

The multiplying circuit 163 executes spectrum spread for the duplication preventing control signal stream FS using the PN code stream PS produced as explained above to form the SS duplication preventing control signal S5. As explained above, the duplication preventing control signal S4 is supplied to the multiplying circuit 163 as the duplication preventing control signal stream FS to be completed in the effective image section in one vertical section and this signal is spectrum spread to be completed by the PN code stream PS of one period.

Namely, even when the duplication preventing control signal S4 indicates the control details for the duplication preventing control with one bit or indicates the control details for the duplication preventing control with a plurality of bits such as 2 bits or 3 bits, the spectrum spread is performed using the PN code stream PS of one period. As explained, since the duplication preventing control signal S3 is spectrum spread to be completed by the PN code stream PS of one period, the same SS duplication preventing control signal S5 is formed corresponding to each vertical section.

The SS duplication preventing control signal S5 formed by the SS duplication preventing control signal generating means 16 is supplied to the D/A converting circuit 192. The D/A converting circuit 192 converts the SS duplication preventing control signal S5 to the analog SS duplication preventing control signal S5A and then supplies it to the adding means 17.

The adding means 17 superimposes the analog SS duplication preventing control signal S5A to the analog image signal S3 to form an output image signal S6A and to output this signal. As explained, the adding means 17 also has a function of a superimposing means to superimpose, to the analog image signal S3, the SS duplication preventing control signal S5A which is the duplication preventing control signal spectrum spread by the PN code stream PS.

In this case, even when the noise reduction utilizing correlation between the adjacent fields or frames, curtailment and interpolation of pixels in the horizontal direction for compression and enlargement in the horizontal direction of the image, curtailment or interpolation in the time axis direction, namely curtailment or interpolation of fields are executed, the data stream which never generate any change in its content can be formed as the data stream of the SS duplication preventing control signal in the horizontal direction and time axis direction of the image formed by the image signal to which the SS duplication preventing control signal is superimposed.

Accordingly, when the interpolation and curtailment of the image signal by the noise reduction utilizing correlation in the horizontal direction and vertical direction of the image signal, enlargement and compression of image, display size conversion of image, partial use and partial deletion of image as explained above are executed in the output apparatus 10 and the apparatus such as a recording apparatus to receive the image signal from this output apparatus 10 or between the output apparatus 10 and an apparatus for receiving the image signal from this output apparatus 10, it is possible to surely transmit the spread spectrum duplication preventing control signal (SS duplication preventing control signal) by superimposing it to the image signal and also to provide such signal to the subsequent apparatus.

Moreover, since the duplication preventing control signal is spectrum spread and superimposed to the image signal, the SS duplication preventing control signal to be superimposed to the image signal does not deteriorate the image signal and the SS duplication preventing control signal is never eliminated easily from the image signal.

FIG. 14 shows a relationship between the duplication preventing control signal and a main information signal or the image signal in this example using the spectrum. The duplication preventing control signal includes a small amount of information and is a low bit rate signal and also a narrow band signal as shown in FIG. 8(*a*). When this signal is spectrum spread, it is changed to the broad band signal as shown in FIG. 8(*b*). In this case, the spectrum spread signal level is lowered in inverse proportion to an enlargement ratio of the band.

This spectrum spread signal, namely the SS duplication preventing control signal S7A is superimposed to the information signal by means of the adding means 17. In this case, as shown in FIG. 8(*c*), the SS duplication preventing control signal S7A is superimposed in the smaller level than the dynamic range of the image signal as the information signal. Thereby, as explained above, the image signal to which the SS duplication preventing control signal is superimposed is supplied to the monitor receiver and when the image is reproduced, the excellent reproduced image can be obtained almost not including any influence of the SS duplication preventing control signal.

On the other hand, as will be explained later, when inverse spectrum spread is executed to detect the SS duplication preventing control signal in the recording side, the SS duplication preventing control signal is recovered again as the narrow band signal as shown in FIG. 8(d). Since the sufficient band spread rate is given, power of the duplication preventing control signal after inverse spread exceeds the information signal and thereby detection is now possible.

In this case, since the SS duplication preventing control signal is superimposed to the analog image signal in the same time and same frequency as the analog image signal, it cannot be deleted or repaired with a filter or simple replacement of information.

Accordingly, the SS duplication preventing control signal superimposed to the image signal is never eliminated and the SS duplication preventing control signal can surely supplied to the apparatus such as the monitor receiver and recording apparatus.

As explained, the analog output image signal S6A to which the SS duplication preventing control signal S5A is superimposed is supplied to the monitor receiver for displaying the image or to the recording apparatus 20 explained later.

In the first embodiment, the output apparatus 10 uses MPEG2 and executes data compression to produce the reset signal RE to generate, from the first code, the PN code stream with reference to the I picture of the image signal recorded in the recording medium 100. However, the apparatus 10 is not limited thereto.

For example, it is also possible to provide the predetermined interval and insert thereto the timing signal for generating the reset signal RE within the vertical blanking period. Thereby when the timing signal is detected, the PN code stream is output from the first code.

In the second embodiment, the PN code of four chips is generated for the effective image section of one horizontal section for simplifying the explanation, but the facilities are not limited thereto. Actually, the PN code stream of about 720 chips in maximum can be used for the system of NTSC system corresponding to each pixel to form the image of the effective image section of one horizontal section.

However, in the case of generating many PN codes for the effective image section of one horizontal section, the duplication preventing control signal which is spectrum spread by this PN code stream becomes the high frequency signal and thereby it is not preferable because the duplication preventing control signal is probably eliminated by a noise canceler for reducing the high frequency element in t he image signal.

Therefore, in the case of using a noise canceler to remove the high frequency element of 1 MHz or higher, the number of codes of the PN code stream used for spectrum spread is adequately set, for example, by using the PN code stream consisting of the PN codes less than 100 chips for one horizontal section.

Next, the image signal recording apparatus 20 of the first, second and third embodiments, which respectively receives the image signal S6A from the image signal output apparatus 10 of the first, second and third embodiments and records the image signal, will be explained.

Figure 15:
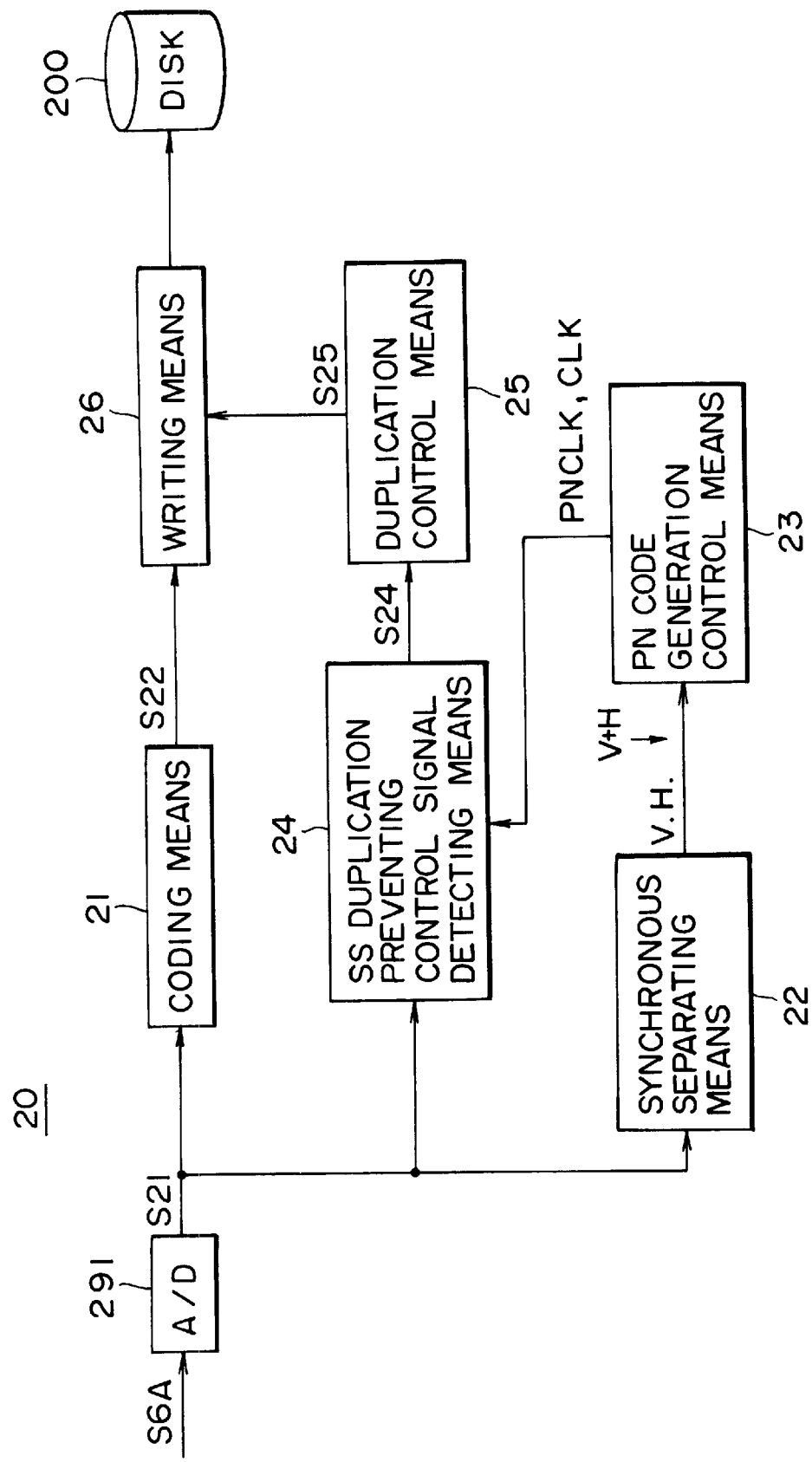
FIG. 15 is a block diagram for explaining an embodiment of an image signal recording apparatus to which the image signal receiving apparatus of the present invention is applied.

FIG. 15 is a diagram for explaining an image signal recording apparatus (hereinafter referred to only as recording apparatus) 20 used in the image signal duplication control system of this embodiment. Namely, the recording apparatus 20 corresponds to the recording system of the DVD apparatus in these embodiments.

The image signal recording apparatus 20 of the first, second and third embodiment comprises, as shown in FIG. 15, an encoding means 21, a synchronous separating means 22, a PN code generation controlling means 23, a detecting means for detecting the duplication preventing control signal which is spectrum spread and is superimposed to the image signal (hereinafter referred to as SS duplication preventing control signal detecting means) 24, a duplication controlling means 25 for controlling acknowledgment or inhibit of recording, a writing means 26 and an AD converting circuit 291. Moreover, a recording medium 200 is a DVD to which an image signal is written by the recording apparatus 20.

The image signal S6A supplied from the output apparatus 10 is converted to a digital image signal S21 by the A/D converting circuit 291 and is then supplied to the encoding means 21, synchronous separating means 22 and SS duplication preventing control signal detecting means 24.

The encoding means 21 receives the digital image signal S21 and executes encoding process such as elimination of image synchronous signal and data compression of digital image signal to form a digital image signal S22 for recording to be supplied to a recording medium 200 and then supplies this signal to the writing means 26.

In the image signal recording apparatus 20 of the first embodiment, the synchronous separating means 22 extracts the vertical synchronous signal V from the digital image signal S21 before the encoding process and then supplies the signal V to the PN code generation controlling means 23.

The PN code generation controlling means 23 of the recording apparatus 20 is structured like the PN code generation controlling means 15 of the output apparatus 10 explained in regard to FIG. 3. Therefore, the PN code generation controlling mean 23 is assumed to have the structure shown in FIG. 3 for the convenience of explanation.

In the first embodiment, the PN code generation clock signal generating means 151 of the PN code generation controlling means 23 uses the vertical synchronous signal V as the reference signal to produce the PN code generation clock PNCLK for generating the PN code stream for inverse spread to be sued for the inverse spectrum spread, corresponding to the image signal output apparatus 10 explained above.

The PN code generation clock signal PNCLK produced here is similar to the PN code generation clock signal PNCLK shown in FIG. 4B produced in the PN code generation controlling means 15 of the image signal output apparatus 10 explained previously and is used to produce the PN code of one clock period in every vertical section, in this case, defining one vertical section as one chip.

Moreover, the timing signal generating means 152 of the PN code generation controlling means 23 produces various timing signals on the basis of the vertical synchronous signal V.

The PN code generation clock signal PNCLK produced in the PN code generation controlling means 23 is then supplied to the SS duplication preventing control signal detecting means 24.

The SS duplication preventing control signal detecting means 24 is provided with the PN code generator and multiplying circuit to have the function as an inverse spectrum spreading means which executes the inverse spectrum spread to extract the duplication preventing control signal superimposed to the image signal S21.

The SS duplication preventing control signal detecting means 24 produces the PN code stream for inverse spread depending on the PN code generation clock signal PNCLK. This PN code stream for inverse spread is formed of the PN code produced by defining one vertical section as one chip and has the same code pattern as the PN code stream PS used for spectrum spread of the duplication preventing control signal in the output apparatus 10 explained above.

Moreover, the SS duplication preventing control signal detecting means 24 executes the inverse spectrum spread, for the image signal S21, using the PN code stream for inverse spread which is the same PN code stream as that used for spectrum spread, to extract the duplication preventing control signal superimposed to the image signal S21. The duplication preventing control signal S24 extracted is supplied to the duplication controlling means 25.

The reset timing of the PN code stream for inverse spread produced by the SS duplication preventing control signal detecting means 24, namely the timing for generating the PN code of the predetermined code pattern from its first code is produced, although not illustrated, depending on the I picture produced by the code process of the encoding means 21.

The duplication controlling means 25 decodes the duplication preventing control signal S24 to discriminate whether the image signal supplied to the recording apparatus 20 is inhibited or allowed to be duplicated. Depending on the discrimination result, the write control signal S 25 is produced and is then supplied to the writing means 26 to execute the duplication control for inhibiting or allowing the writing of the image signal S22.

The writing means 26 writes, when the write control signal S25 acknowledges the writing, the image signal to the recording medium 200 and does not write, when the write control signal S25 inhibits the writing, the image signal S22 to the recording medium 200.

As explained, the recording apparatus 20 of this embodiment executes the inverse spectrum spread using the same PN code stream as that used for spectrum spread of the duplication preventing control signal to extract the duplication preventing control signal superimposed to the image signal corresponding to the output apparatus 10.

As explained previously, in the output apparatus 10, the PN code stream consisting of the PN codes defining one vertical section as one chip is used to spectrum spread the duplication preventing control signal S3. Thereby the SS duplication preventing control signal S5 can be formed and the same SS duplication preventing control signal is superimposed, within each vertical section, into each vertical section of the image signal from the output apparatus 10.

Therefore, as explained previously, even when the noise reduction utilizing correlation in the horizontal direction and vertical direction of the image signal, enlargement and compression of image, display size conversion of image and interpolation and curtailment of image signal by the partial use or partial deletion of image are executed in the output apparatus 10 or recording apparatus 20 or between the output apparatus 10 and recording apparatus 20, the SS duplication preventing control signal superimposed to the image signal can be extracted by executing the inverse spectrum spread as the original duplication preventing control signal before the spectrum spread to perform the duplication preventing control depending on the extracted duplication preventing control signal.

Moreover, the PN code generation clock signals of the same period can also be produced respectively in the output apparatus 10 and recording apparatus 20 by generating the PN code generation clock signal PNCLK using the vertical synchronous signal as the reference signal in the output apparatus 10 and recording apparatus 20. Thereby, the PN code stream consisting of the PN codes defining one clock period as one chip can also be produced in the output apparatus 10 and recording apparatus 20.

In addition, in the output apparatus 10 and recording apparatus 20, the PN code stream is produced from its first code in the timing of the I picture which is inserted in the constant period.

Thereby, since the recording apparatus 20 is not required to execute the phase control to produce the PN code stream for inverse spread in the same timing by detecting the PN code stream in which the duplication preventing control signal superimposed to the image signal is spectrum spread using, for example, a sliding correlator, etc., the duplication preventing control signal by the inverse spectrum spread can be extracted quickly.

In the embodiment explained previously, the PN code generation clock PNCLK defining one vertical section as one clock period is produced using the vertical synchronous signal as the reference signal to generate the PN code defining one clock period as one chip in the output apparatus 10 and control apparatus 20, but the facilities are not limited thereto.

For example, the PN code generation clock signal PNCLK (FIG. 16B) defining the two vertical sections as one clock period may be produced as shown in FIG. 16 and the PN code generation clock signal PNCLK (FIG. 16C) defining the three vertical section as one clock period may also be produced. Moreover, the PN code generation clock signal PNCLK defining several vertical sections as one clock period may also be produced.

As explained above, it is also possible to a certain extent to curtail the image signal in unit of the frames by utilizing the PN code stream consisting of the PN codes defining several vertical sections as one chip using the PN code generation clock signal defining a plurality of vertical sections as one clock period. Namely, it can be realized that the SS duplication preventing control signal superimposed to the image signal as a whole is never changed even when the image signal is curtailed in unit of frame.

Here, the series of the PN code stream may be changed in the time axis direction. In other words, the PN code streams in a plurality of series may be used in the time axis direction.

For example, the PN code streams of different series may be used as many as one repetition frequency by generating the PNM code streams of different series. In this case, much more data may be transmitted.

In the image signal recording apparatus 20 of the second embodiment of the present invention, the synchronous separating means 22 extracts the horizontal synchronous signal H from the digital image signal S21 before the encoding process and then supplies this signal to the PN code generation controlling means 23.

In this embodiment, the PN code generation controlling means 23 of the recording apparatus 20 is similar in the structure to the PN code generation controlling means 15B of the output apparatus 10 explained in regard to FIG. 8. Therefore, the PN code generation controlling means 23 is assumed to have the structure shown in FIG. 8.

The PN code generation timing signal generating means 151B of the PN code generation controlling means 23 uses the horizontal synchronous signal H as the reference signal to produce, corresponding to the image signal output apparatus 10 explained above, the PN code generation timing signal S23 which provides the timing to start generation of the PN code stream for inverse spread to be used for inverse spectrum spread. The PN code generation timing signal S23 produced here is identical to the PN code generation timing signal S4 shown in FIG. 9B produced in the PN code generation controlling means 15B of the output apparatus 10 explained above and this timing signal 23 provides the timing corresponding to the starting position of the effective image section of each horizontal section of the frame formed by the image signal.

The PLL circuit 152B of the PN code generation controlling means 23 produces the clock signal CLK1 synchronized with the horizontal synchronous signal H. This clock signal CLK1 is synchronized with the horizontal synchronous signal and has the same frequency as the clock signal CLK used in the image signal output apparatus 10 explained above. Moreover, the timing signal generating means 163 of the PN code generation controlling means 23 produces various timing signals depending on the horizontal synchronous signal H.

The PN code generation timing signal S23 and clock signal CLK1 produced in the PN code generation controlling means 23 are supplied to the SS duplication preventing control signal detecting means 24.

In this embodiment, the SS duplication preventing control signal detecting means 24 is provided with the PN code generator and multiplying circuit to have the function as the inverse spectrum spreading means which extracts the duplication preventing control signal superimposed to the image signal S21 by executing the inverse spectrum spread.

The SS duplication preventing control signal detecting means 24 produces the PN code stream for inverse spread depending on the PN code generation timing signal S23 and clock signal CLK1. This PN code stream for inverse spectrum spread defines the effective image section of one horizontal section as one period and has the same code pattern as the PN code stream PS used for the spectrum spread of the duplication preventing control signal in the output apparatus 10.

The SS duplication preventing control signal detecting means 24 executes the inverse spectrum spread to the image signal of the effective image section in each horizontal section to which the SS duplication preventing control signal is superimposed using the PN code stream for inverse spread which is the same PN code stream as that used for spectrum spread in order to extract the duplication preventing control signal superimposed in the image signal. The extracted duplication preventing control signal S24 is then supplied to the duplication controlling means 25.

As explained above, the duplication controlling means 25 produces the write control signal S25 depending on the duplication preventing control signal S24 and the writing means 26 inhibits or acknowledges writing of the image signal S22 to the recording medium 200 depending on the write control signal S25.

As explained, the recording apparatus 20 of this embodiment executes, corresponding to the output apparatus 10, the inverse spectrum spread to the image signal of the effective image section of each horizontal section to which the SS duplication preventing control signal is superimposed using the PN code stream same as that used for the spectrum spread of the duplication preventing control signal in order to extract the duplication preventing control signal superimposed to the image signal.

In this case, the same SS duplication preventing control signal is superimposed to the image signal output from the output apparatus 10 in the effective image section of all horizontal sections of all frames.

Therefore, as explained above, even when the noise reduction utilizing correlation of the image signal is executed, the SS duplication preventing control signal superimposed to the image signal is never eliminated.

Moreover, for enlargement of image in the vertical direction or conversion of the image signal of the NTSC system into the image signal of PAL system, the horizontal scanning lines forming the image are interpolated. In this case, as the horizontal scanning lines used for the interpolation, the horizontal scanning lines adjacent to the position to be interpolated are used. Therefore, like the other horizontal scanning lines, the SS duplication preventing control signal is also superimposed to the horizontal scanning line interpolated and the horizontal scanning lines not including the SS duplication preventing control signal are never generated.

In addition, the duplication preventing control signal is spectrum spread and is then superimposed to the image signal to be completed in the effective image section of one horizontal section. Therefore, even when the horizontal scanning lines forming the image are curtailed to compress the image in the vertical direction or convert the image signal of PAL system into the image signal of the NTSC system, it is never generated that the SS duplication preventing control signal is deteriorated, for example, a part of the SS duplication preventing control signal is deleted and thereby details of duplication preventing control indicated by the SS duplication preventing control signal cannot be discriminated.

Moreover, since the same SS duplication preventing control signal is superimposed in the effective image section of each horizontal scanning section of all frames, even when the interpolation and curtailment of frame are executed, it is never generated that the SS duplication preventing control signal is deteriorated and thereby details of the duplication preventing control indicated by the SS duplication control signal cannot be discriminated.

In addition, even when the image signal to which the spectrum spread duplication preventing control signal is superimposed is reproduced in the irregular speed, the superimposed duplication preventing control signal is never deleted or deteriorated. Moreover, even when so-called the cutting edition is performed to cut or paste the image signal, since the spectrum spread duplication preventing control signal is superimposed to each horizontal section of all frames formed by the image signal, the duplication preventing control signal can be extracted to perform the duplication preventing control depending on the extracted duplication preventing control signal.

Further, since the SS duplication preventing control signal is superimposed to the effective image section of each horizontal section, even when the synchronous signal is changed, the SS duplication preventing control signal superimposed to the image signal is never deleted and deteriorated.

Therefore, in the recording apparatus 20, the duplication preventing control signal which is spectrum spread and superimposed to the image signal can be surely and accurately extracted and thereby the duplication preventing control may be realized depending on the extracted duplication preventing control signal.

In addition, the PN code stream can be produced in the same timing for the horizontal synchronous signal in the output apparatus 10 and recording apparatus 20 by generating the PN code generation timing signals S4, S23 in the output apparatus 10 and recording apparatus 20 using the horizontal synchronous signal as the reference signal.

Thereby, it is no longer required to use the sliding correlator as in the case of the image recording apparatus 20 of the first embodiment and the duplication preventing control signal can be quickly extracted through the inverse spectrum spread.

In addition, as explained above, in the output apparatus 10 and recording apparatus 20, since the frequencies of the clock signals CLK, CLK1 are determined using the horizontal synchronous signal as the reference signal, the clocks signals of the same frequency may surely be produced in both output apparatus 10 and recording apparatus 20.

In the embodiment explained previously, the horizontal synchronous signal is used as the reference signal to produce the PN code stream which is repeated in every effective image section of one horizontal section but facilities are not limited thereto. For example, it is also possible that one horizontal section is divided into a plurality of subsections such as two or three subsections to use the PN code stream which repeats in every ½ horizontal section or ⅓ horizontal section. In this case, it is enough to use the PN code stream which repeats in every ½ horizontal section or ⅓ horizontal section even in the recording apparatus 20 corresponding to the output apparatus 10.

Moreover, in the embodiment explained above, as shown FIG. 9, the SS duplication preventing control signal is superimposed to the effective image section of each horizontal section of the image signal, but it is also possible that the SS duplication preventing control signal is not inserted to all effective image regions. For example, it is also possible to set in details the effective image sections for superimposing the SS duplication preventing control signal depending on the horizontal synchronous signal, for example, in such a manner as to several tens of clocks from which clock counted from the front edge of the horizontal synchronous signal.

In this case, it is enough for the side receiving the image signal to which the duplication preventing control signal is superimposed to produce, for the image signal, the PN code for inverse spread in the same timing as the output apparatus depending on the PN code generation timing signal for inverse spread produced on the basis of the horizontal synchronous signal in view of executing the inverse spectrum spread using such produced PN code.

In the image signal recording apparatus 20 of the third embodiment of the present invention, the synchronous separating means 22 extracts the horizontal synchronous signal H and vertical synchronous signal V from the digital image signal S21 before the encoding process and then supplies such synchronous signals to the PN code generation controlling means 23.

In this embodiment, the PN code generation controlling means 23 of the recording apparatus 20 is structured in the same structure as the PN code generation controlling means 15C of the output apparatus 10 explained above in regard to FIG. 11. Therefore, the PN code generation controlling means 23 is assumed to have the structure shown in FIG. 11 for the convenience of explanation.

The PN code reset timing signal generating means 151C of the PN code generation controlling means 23 uses the vertical synchronous signal V as the reference signal and produces, corresponding to the image signal output apparatus 10 explained previously, the PN code reset timing signal RE for providing the reset timing of the PN code stream for inverse spread to be used for the inverse spectrum spread. The PN code reset timing signal RE produced here is similar to the PN code reset timing signal produced by the PN code generation controlling means 15 of the output apparatus 10 explained above and provides the timing corresponding to the starting position of the vertical section of the image signal.

The PN clock generating means 152C of the PN code generation controlling means 23 produces the PN clock signal PNCLK synchronized with the horizontal synchronous signal H. This clock signal PNCLK has the same frequency as the clock signal PNCLK used in the image signal output apparatus 10 explained above. Moreover, the timing signal generating means 163 of the PN code generation controlling means 23 produces various timing signals depending on the horizontal synchronous signal H.

The PN code reset timing signal RE and clock signal PNCLK produced by the PN code generation controlling means 23 are then supplied to the SS duplication preventing control signal detecting means 24.

In this embodiment, the SS duplication preventing control signal detecting means 24 is provided with a PN code generator and a multiplying circuit and also has a function as the inverse spectrum spreading means for extracting the duplication preventing control signal superimposed to the image signal S21 through the inverse spectrum spread.

The SS duplication preventing control signal detecting means 24 produces the PN code stream for inverse spread depending on the PN code reset timing signal RE and clock signal PNCLK. This PN code stream for inverse spread defines one vertical section as one period and has the same code pattern as t he PN code stream used for spectrum spread of the duplication preventing control signal in the output apparatus 10.

Here, the SS duplication preventing control signal detecting means 24 executes, for the image signal of each vertical section to which the SS duplication preventing control signal is superimposed, the inverse spectrum spread using the PN code stream for inverse spread which is the same PN code stream as that used for spectrum spread to extract the duplication preventing control signal superimposed to the image signal. The extracted duplication preventing control signal S24 is supplied to t he duplication controlling means 25.

The duplication controlling means 25 produces the write control signal S25 depending on the duplication preventing control signal S24 as explained previously and the writing means 26 inhibits or acknowledges writing of the image signal S22 into the recording medium 200 depending on the write control signal S25.

As explained, the recording apparatus of this embodiment executes, corresponding to the output apparatus 10, the inverse spectrum spread using the PN code stream which is same as that used for the spectrum spread of the duplication preventing control signal for the image signal to which the SS duplication preventing control signal is superimposed, in order to extract the duplication preventing control signal superimposed to the image signal.

In this case, as explained above, the SS duplication preventing control signal which is the identical data in the horizontal direction and time axis direction is superimposed to the image signal output from the output apparatus 10.

Therefore, as explained previously, even when the noise reduction utilizing correlation of image signal is executed, the SS duplication preventing control signal superimposed to the image signal is never eliminated. In addition, even when deletion and interpolation are executed in the horizontal direction and time axis direction of the image, the SS duplication preventing control signal superimposed to the image signal is never lost.

Accordingly, even when the aspect radio converting process or irregular speed reproduction is executed, namely when the so-called cutting edition is executed, the SS duplication preventing control signal is not deteriorated and the details of duplication preventing control instructed by the SS duplication preventing control signal can always be discriminated.

Therefore, in the recording apparatus 20, the duplication preventing control signal which is spectrum spread and superimposed to the image signal can surely and accurately be extracted and the duplication preventing control may be realized depending on the extracted duplication preventing control signal.

Moreover, in the output apparatus 10 and recording apparatus 20, the PN code stream can be produced in the same timing for the vertical synchronous signal respectively in the output apparatus 10 and recording apparatus 20 by using the vertical synchronous signal as the reference signal to produce the PN code reset timing signal RE.

Thereby, in the recording apparatus 20, since it is no longer required, for example, that the sliding correlator is used to detect the PN code steam spectrum spreading the duplication preventing control signal superimposed in the image signal to execute the phase control in order to produce the PN code stream for inverse spread in the same timing, the duplication preventing control signal can be quickly extracted by the inverse spectrum spread.

As is explained previously, since the frequency of the clock signals CLK, CLK1 is determined by using the horizontal synchronous signal as the reference signal in the output apparatus 10 and recording apparatus 20, the clock signal of the same frequency can surely be produced in both output apparatus 10 and recording apparatus 20.

In the embodiment explained previously, the SS duplication preventing control signal is superimposed to all sections of the image signal in the output apparatus 10 and recording apparatus 20, but it is also possible to superimpose the SS duplication preventing control signal only to the effective image section, except for the vertical blanking period and horizontal blanking period. In addition, it is not always required to superimpose the SS duplication preventing control signal to all effective image sections. For example, it is of course possible to execute fine setting depending on the horizontal synchronous signal, for example, in such a manner that the SS duplication preventing control signal is superimposed to several tens of clocks from which clock counted from the front edge of the horizontal synchronous signal.

In addition, the PN clock signal PNCLK has been the clock of horizontal period to assign one chip to each horizontal section, but it is also allowed to assign one chip to two horizontal sections using the PN clock signal PNCLK of two horizontal periods as shown in FIG. 3F. Moreover, it is also possible to use the PN clock signal PNCLK of a plurality of horizontal periods of three horizontal periods or more to generate the PN code having the repetition frequency of one vertical period.

Further, the period of the PN code is not limited to one vertical period and the PN code may be generated to repeat several times in one vertical period, for example, it may be set to 0.5 vertical period to repeat two times in one vertical period.

In addition, in the embodiment explained above, the analog image signal is supplied to the output apparatus 20 from the output apparatus 10 through the analog connection, but the present invention may be applied to the digital connection.

Namely, the spectrum spread duplication preventing control signal may be superimposed to the analog image signal and also to the digital image signal.

Moreover, it is also possible in the recording apparatus 20 that the filtering is made previously to the image signal to be supplied to the SS duplication preventing control signal detecting means to extract the low level image signal to which the spectrum spread duplication preventing control signal is superimposed and then the extracted SS duplication preventing control signal detecting means.

In the embodiment explained above, the output apparatus and recording apparatus are assumed as the DVD apparatuses, but these are not limited thereto and the present invention can be adopted to VTR, digital VTR, and output apparatus and recording apparatus of video disk and video CD. Namely, the present invention may be applied to any analog apparatus such as analog VTR and any digital apparatus such as DVD apparatus.

In the embodiment explained previously, the duplication preventing control signal added to the image signal recorded in the recording medium 100 is extracted and it is then spectrum spread using the PN code and it is then superimposed to the image signal supplied to the recording apparatus 20, but it is also possible to use the recording medium to which the image signal previously superimposing the spectrum spread duplication preventing control signal is recorded.

Namely, in the first embodiment, the SS duplication preventing control signal is formed by spectrum spreading the duplication preventing control signal using the PN code which defines, for example, one vertical section or several vertical sections as one chip for the image signal to be recorded to the recording medium. Moreover, the recording medium having recorded the image signal to which the formed SS duplication preventing control signal is superimposed is produced.

In the second embodiment, the duplication preventing control signal is spectrum spread so that it is completed in the effective image section of one horizontal section using the PN code stream defining the effective image section of one horizontal section as one period for the image signal recorded to the recording medium and the spectrum spread duplication preventing control signal is superimposed to the effective image section of each horizontal section of the image signal. Thereby, the recording medium in which the image signal having superimposed the spectrum spread duplication preventing control signal into the effective image section is recorded can be produced.

In the third embodiment, the duplication preventing control signal is spectrum spread to be completed in one vertical section using, for example, the PN code stream defining one vertical section as one period for the image signal to be recorded to the recording medium and then the spectrum spread duplication preventing control signal is superimposed to the image signal. Thereby, the recording medium in which the image signal having allowed superimposing of the spectrum spread duplication preventing control signal is recorded can be produced.

In the case of the recording medium where the image signal to which the spectrum spread duplication preventing control signal is superimposed previously is recorded, it is no longer required for the output apparatus to execute various processes such as extraction of the duplication preventing control signal, generation of the PN code, spectrum spread and superimposing of the spectrum spread duplication preventing control signal to the image signal. Namely, in this case, it is required in the side of the output apparatus to reproduce and output the image signal recorded in the recording medium.

In this case, in the recording apparatus side, the PN code stream for inverse spread of the same code pattern as the PN code stream in which the SS duplication preventing control signal superimposed to the image signal is spectrum spread is produced in the same timing as the spectrum spread for the image signal as in the case of the recording apparatus 20 of the embodiment explained above and the inverse spectrum spread is executed using this PN code stream for inverse spectrum spread to extract the duplication preventing control signal superimposed to the image signal.

When the spectrum spread duplication preventing control signal is previously superimposed to the image signal recorded in the recording medium as explained above, if the function to extract the duplication preventing control signal by inverse spectrum spread to the recording apparatus side is provided, the duplication preventing control may be done effectively by extracting the duplication preventing control signal superimposed previously to the image signal.

Moreover, it is also possible to provide a duplication preventing control signal generating means is provided in the output apparatus and thereby the duplication preventing control signal generated by the output apparatus is spectrum spread using the PN code stream and is then output after it is superimposed to the image signal.

In this case, even when the duplication preventing control signal is intrinsically not recorded in the recording medium or when the spectrum spread duplication preventing control signal is not superimposed, the duplication preventing control signal is produced in the output apparatus and the duplication control can be executed in the recording apparatus side using the duplication preventing control signal superimposed to the image signal.

Moreover, in the embodiment explained above, the output apparatus and recording apparatus as the DVD apparatus have been used as the duplication preventing control apparatus but these apparatuses are not limited thereto. For example, the present invention can also be applied when the present invention is introduced into the output apparatus of television signal in the broadcasting station side and the signal in which the spectrum spread duplication preventing control signal is superimposed to the television signal before it is transmitted. In the receiving side, in this case, the inverse spectrum spread is performed to extract the duplication preventing control signal superimposed to the image signal and duplication preventing control of the image signal can be executed depending on such duplication preventing control signal.

Of course, the present invention can also be adopted to the image output and receiving apparatuses in such a case that the image signal is transmitted or received through the cable.

Moreover, in above embodiment, the duplication preventing control signal is superimposed as the additional information but the additional information to be superimposed to the image signal is not limited to t he duplication preventing control signal.

For example, a copyright information which can identify the copyright of the image to be re produced from the image signal can be spectrum spread and then superimposed to the image signal. In this case, since the copyright holder may be identified by extracting the copyright information superimposed to the image signal through the inverse spectrum spread, this idea is effective for prevention of infringement of copyright and when if the image under own copyright is used without permission, infringement of copyright can be displayed easily.

As explained previously, even when noise reduction utilizing correlation in the horizontal and vertical direction of the image signal, enlargement and compression of image formed by the image signal, conversion of image size and partial use or partial deletion of image are executed, the copyright information can surely be extracted and used because it is never eliminated and deteriorated.

According to the first embodiment, the additional information which is spectrum spread and superimposed to the image signal can never be eliminated and deteriorated if the noise reduction utilizing correlation in the horizontal direction and vertical direction of the image signal is executed.

Moreover, even when enlargement or compression, size conversion or partial use or partial deletion of the image reproduced from the image signal where the spectrum spread additional information is superimposed are executed as explained previously, change of the additional information superimposed to the image signal can be prevented.

Therefore, even when enlargement or compression of image, conversion of image size or partial use or partial deletion of image are executed, the spectrum spread additional information superimposed to the image signal to form the image can surely be detected.

According to the second embodiment of the present invention, the same additional information spectrum spread by the spread signal defining the section in one horizontal section as one period is repeatedly superimposed to each horizontal section of all frames. Thereby, the additional information which has been spectrum spread and superimposed to the image signal is never eliminated or deteriorated by the noise reduction utilizing correlation of the image signal.

In addition, even when the horizontal scanning lines of image formed by the image signal or frame interpolation or curtailment is executed and thereby the image signal has been changed, change of the additional information which is spectrum spread and superimposed to the image signal can be prevented.

Thereby, the additional information which is spectrum spread and superimposed to the image signal can surely be transmitted and the spectrum spread additional information superimposed to the image signal received can surely be detected in the receiving side.

According to the third embodiment, the additional information which is formed to become identical data in both horizontal direction and time axis direction is repeatedly superimposed to the image signal. Thereby, the additional information which is spectrum spread and is superimposed to the image signal is never eliminated and deteriorated due to the noise reduction utilizing correlation of the image signal.

Moreover, even when the curtailment and interpolation in the horizontal direction or curtailment and interpolation in the time axis direction of the image signal are executed and thereby the image signal is changed, change of the additional information which is spectrum spread and superimposed to the image signal can be prevented.

Thereby, the additional information which is spectrum spread and superimposed to the image signal can surely be transmitted and the spectrum spread additional information superimposed to the received image signal can surely be detected in the receiving side.

What is claimed is:

1. A method for superimposing additional information on an image signal that includes a plurality of first pictures and a plurality of second pictures, wherein the first pictures are encoded without using a predictive encoding and the second pictures are encoding using a motion compensating prediction, the method comprising the steps of:

providing codes with a timing based on an appearance of the first picture encoded without using a predictive encoding; and superimposing said additional information on the image signal using the codes.

2. The method according to claim 1, wherein said additional information is a duplication preventing control information for duplication prevention control of the image signal on which the additional information is superimposed.

3. A method for extracting additional information superimposed on an image signal that includes a plurality of first pictures and a plurality of second pictures, wherein the first pictures are encoded without using a predictive encoding and the second pictures are encoded using a motion compensating prediction, the method comprising the steps of:

providing codes with timing based on an appearance of the first picture encoded without using a predictive encoding and extracting the additional information superimposed on the image signal codes.

4. The method according to claim 3, further comprising the step of:

preventing duplication of said image signal based on the additional information extracted from the image signal, wherein the additional information is a duplication prevention control signal.

5. Apparatus for superimposing additional information on an image signal that includes a plurality of first pictures and a plurality of second pictures, wherein the first pictures are encoded without using a predictive encoding and the second pictures are encoded using a motion compensating prediction, the apparatus comprising:

means for providing codes with a timing based on an appearance of the first picture encoded without using a predictive encoding; and means for superimposing the additional information on the image signal using the codes from the means for providing.

6. The apparatus for superimposing according to claim 5, wherein the additional information is duplication preventing control information for duplication prevention control of the image signal on which the additional information is superimposed.

7. Apparatus for extracting additional information superimposed on an image signal that includes a plurality of first pictures and a plurality of second pictures, wherein the first pictures are encoded without using a predictive encoding and the second pictures are encoded using a motion compensating prediction, the apparatus comprising:

means for providing codes with a timing based on an appearance of the first pictures encoded without using a predictive encoding; and means for extracting the additional information from the image signal using the codes provided by the means for providing.

8. The apparatus for extracting according to claim 7, wherein the additional information extracted from the image signal is a duplication prevention control signal for preventing duplication of the image signal.

* * * * *